United States Patent
Lee et al.

(10) Patent No.: US 11,254,427 B2
(45) Date of Patent: Feb. 22, 2022

(54) UNMANNED AERIAL VEHICLE HAVING CAMERA, AND METHOD FOR UNMANNED AERIAL VEHICLE TO PROCESS IMAGE

(71) Applicant: Samsung Electronics Co., Ltd., Gyeonggi-do (KR)

(72) Inventors: Wu Seong Lee, Chungcheongnam-do (KR); Seung Ho Jang, Gyeonggi-do (KR); Neung Eun Kang, Gyeonggi-do (KR); Tae Kyun Kim, Gyeonggi-do (KR); Hyun Soo Kim, Gyeonggi-do (KR); Sang In Baek, Gyeonggi-do (KR); Jung Jae Lee, Gyeongsangbuk-do (KR); Dae Kyung Ahn, Gyeonggi-do (KR); Kwan Hee Lee, Seoul (KR); Seung Nyun Kim, Incheon (KR); Chang Ryong Heo, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 477 days.

(21) Appl. No.: 16/324,779

(22) PCT Filed: Jul. 13, 2017

(86) PCT No.: PCT/KR2017/007457
§ 371 (c)(1),
(2) Date: Feb. 11, 2019

(87) PCT Pub. No.: WO2018/030651
PCT Pub. Date: Feb. 15, 2018

(65) Prior Publication Data
US 2020/0391864 A1    Dec. 17, 2020

(30) Foreign Application Priority Data

Aug. 9, 2016  (KR) .................. 10-2016-0101501

(51) Int. Cl.
*B64C 39/02*    (2006.01)
*B64D 47/08*    (2006.01)

(52) U.S. Cl.
CPC ............ *B64C 39/024* (2013.01); *B64D 47/08* (2013.01); *B64C 2201/027* (2013.01);
(Continued)

(58) Field of Classification Search
None
See application file for complete search history.

(56) References Cited

U.S. PATENT DOCUMENTS 8,902,322 B2    12/2014  Ramsay et al.
9,016,617 B2    4/2015   Wang et al.
(Continued)

FOREIGN PATENT DOCUMENTS

CN    105775151       7/2016
CN    205707360 U  *  11/2016
(Continued)

OTHER PUBLICATIONS

PCT/ISA/210 Search Report issued on PCT/KR2017/007457, pp. 5.
PCT/ISA/237 Written Opinion issued on PCT/KR2017/007457, pp. 12.

*Primary Examiner* — Clayton E. LaBalle
*Assistant Examiner* — Diana Hancock
(74) *Attorney, Agent, or Firm* — The Farrell Law Firm, P.C.

(57) ABSTRACT

An unmanned aerial vehicle has a main body, a plurality of propeller connection parts extending from at least one side surface of the main body by a specific length, a plurality of propellers respectively connected to ends of the plurality of propeller connection parts, and a plurality of cameras mounted on at least one surface of the main body. A first camera interposed between the plurality of propeller con- (Continued)

nection parts among the plurality of cameras is disposed spaced from a center point of the main body by a distance of a first size. A first virtual straight line connecting a center point of a first propeller disposed adjacent to the first camera among the plurality of propellers to a center point of the main body has a length of a second size.

12 Claims, 28 Drawing Sheets

(52) U.S. Cl.
CPC .. *B64C 2201/108* (2013.01); *B64C 2201/127* (2013.01); *B64C 2201/165* (2013.01)

(56) References Cited

U.S. PATENT DOCUMENTS

| | | | |
|---|---|---|---|
| 9,221,536 | B2 | 12/2015 | Wang et al. |
| 9,221,537 | B2 | 12/2015 | Wang et al. |
| 9,233,754 | B1 | 1/2016 | Wang et al. |
| 9,284,049 | B1 | 3/2016 | Wang et al. |
| 9,321,530 | B2 | 4/2016 | Wang et al. |
| 9,394,048 | B2 | 7/2016 | Wang et al. |
| 9,643,722 | B1* | 5/2017 | Myslinski .......... G06K 9/00711 |
| 10,155,584 | B2 | 12/2018 | Wang et al. |
| 10,220,964 | B1* | 3/2019 | Sperindeo ............ H04N 5/2251 |
| 2014/0131510 | A1 | 5/2014 | Wang et al. |
| 2014/0132788 | A1 | 5/2014 | Ramsay et al. |
| 2015/0060606 | A1 | 3/2015 | Wang et al. |
| 2015/0069174 | A1 | 3/2015 | Wang et al. |
| 2016/0031558 | A1 | 2/2016 | Wang et al. |
| 2016/0075431 | A1 | 3/2016 | Wang et al. |
| 2016/0083084 | A1 | 3/2016 | Wang et al. |
| 2016/0159473 | A1 | 6/2016 | Wang et al. |
| 2016/0327950 | A1* | 11/2016 | Bachrach ............. B64C 39/024 |
| 2017/0121016 | A1 | 5/2017 | Wang et al. |
| 2017/0313441 | A1* | 11/2017 | Tsai ...................... B64D 47/08 |
| 2018/0002035 | A1* | 1/2018 | Neely ................. H04N 13/296 |
| 2018/0178896 | A1 | 6/2018 | Lee |
| 2018/0229834 | A1 | 8/2018 | Wang et al. |
| 2018/0281935 | A1 | 10/2018 | Wang et al. |
| 2019/0002094 | A1 | 1/2019 | Wang et al. |
| 2019/0113537 | A1* | 4/2019 | Zhou ................... G05D 1/0011 |

FOREIGN PATENT DOCUMENTS

| | | |
|---|---|---|
| KR | 101378337 | 3/2014 |
| KR | 101589263 | 1/2016 |
| KR | 101625634 | 5/2016 |

* cited by examiner

UNMANNED AERIAL VEHICLE HAVING CAMERA, AND METHOD FOR UNMANNED AERIAL VEHICLE TO PROCESS IMAGE

PRIORITY

This application is a National Phase Entry of PCT International Application No. PCT/KR2017/007457 which was filed on Jul. 13, 2017, and claims priority to Korean Patent Application No. 10-2016-0101501, which was filed on Aug. 9, 2016, respectively, the content of each of which is incorporated herein by reference.

TECHNICAL FIELD

The disclosure relates to an unmanned aerial vehicle including a camera.

BACKGROUND ART

In recent years, users that capture images using an unmanned aerial vehicle such as a drone are increasing. The unmanned aerial vehicle may be integrated with at least one camera to support image capture or may be provided such that at least one camera is capable of being removable.

In the meantime, at least one camera mounted on the unmanned aerial vehicle may support an omnidirectional (e.g., 360 degrees) image. For example, when the unmanned aerial vehicle flies at a specific height, the at least one camera mounted on the unmanned aerial vehicle captures the upper view and lower view images in addition to the front view, rear view, left view, and right view images; and an image processing module (e.g., a processor) included in the unmanned aerial vehicle may generate an omnidirectional image by stitching the captured images.

DISCLOSURE

Technical Problem

However, in an unmanned aerial vehicle, a part of an unmanned aerial vehicle, for example, a propeller may be positioned within a capture area of a camera mounted on the unmanned aerial vehicle. As such, a part of the unmanned aerial vehicle located in the camera's capture area may cover the background or the subject.

In addition, the omnidirectional image captured using the at least one camera mounted on the existing unmanned aerial vehicle may cause dizziness to the user who is watching the image because the shaking occurs depending on the movement of the unmanned aerial vehicle.

Aspects of the disclosure are to address at least the above-mentioned problems and/or disadvantages and to provide at least the advantages described below. Accordingly, an aspect of the disclosure is to provide a structure of an unmanned aerial vehicle that allows a part of the unmanned aerial vehicle not to be positioned within a capture area of a camera mounted on the unmanned aerial vehicle.

Accordingly, an aspect of the disclosure is to provide an unmanned aerial vehicle including an image processing module capable of correcting the captured images.

Technical Solution

In accordance with an aspect of the disclosure, an unmanned aerial vehicle may include a main body, a plurality of propeller connection parts extending from at least one side surface of the main body by a specified length, a plurality of propellers respectively connected to ends of the plurality of propeller connection parts, and a plurality of cameras mounted on at least one surface of the main body. A first camera interposed between the plurality of propeller connection parts among the plurality of cameras may be disposed spaced from a center point of the main body by a distance of a first size. A first virtual straight line connecting a center point of a first propeller disposed adjacent to the first camera among the plurality of propellers to a center point of the main body may have a length of a second size. A second virtual straight line drawn vertically from the first camera to the first straight line may have a length of a third size. The third size may be greater than a radius of the first propeller and the first size may be smaller than the second size.

In accordance with another aspect of the disclosure, an unmanned aerial vehicle may include a main body including at least one of an upper end frame and a lower end frame, a circuit mounting part fixed to the at least one of the upper end frame and the lower end frame, a plurality of propeller connection parts extending from at least one side surface of the main body by a specified length, a plurality of propellers respectively connected to ends of the plurality of propeller connection parts, a plurality of camera connection parts extending from at least one surface of the circuit mounting part, and a plurality of cameras respectively connected to ends of the plurality of camera connection parts. A first camera interposed between the plurality of propeller connection parts among the plurality of cameras may be disposed spaced from a center point of the main body by a distance of a first size. A first virtual straight line connecting a center point of a first propeller disposed adjacent to the first camera among the plurality of propellers to a center point of the main body may have a length of a second size. A second virtual straight line drawn vertically from the first camera to the first straight line may have a length of a third size. The third size may be greater than a radius of the first propeller and the first size may be smaller than the second size.

In accordance with another aspect of the disclosure, an image processing method of an unmanned aerial vehicle may include obtaining a plurality of images corresponding to a plurality of orientations, obtaining information associated with correction of the plurality of images, correcting the plurality of images based on the information associated with the correction, and stitching the corrected plurality of images.

Advantageous Effects

According to various embodiments of the disclosure, a part of the unmanned aerial vehicle is not positioned within the capture area of a camera mounted on the unmanned aerial vehicle, and thus an omnidirectional image in which a background or a subject is not covered may be provided.

According to various embodiments of the disclosure, it is possible to provide an omnidirectional image without shaking by correcting the captured image.

Other aspects, advantages, and salient features of the disclosure will become apparent to those skilled in the art from the following detailed description, which, taken in conjunction with the annexed drawings, discloses various embodiments of the disclosure.

MODE FOR INVENTION

Figure 1:
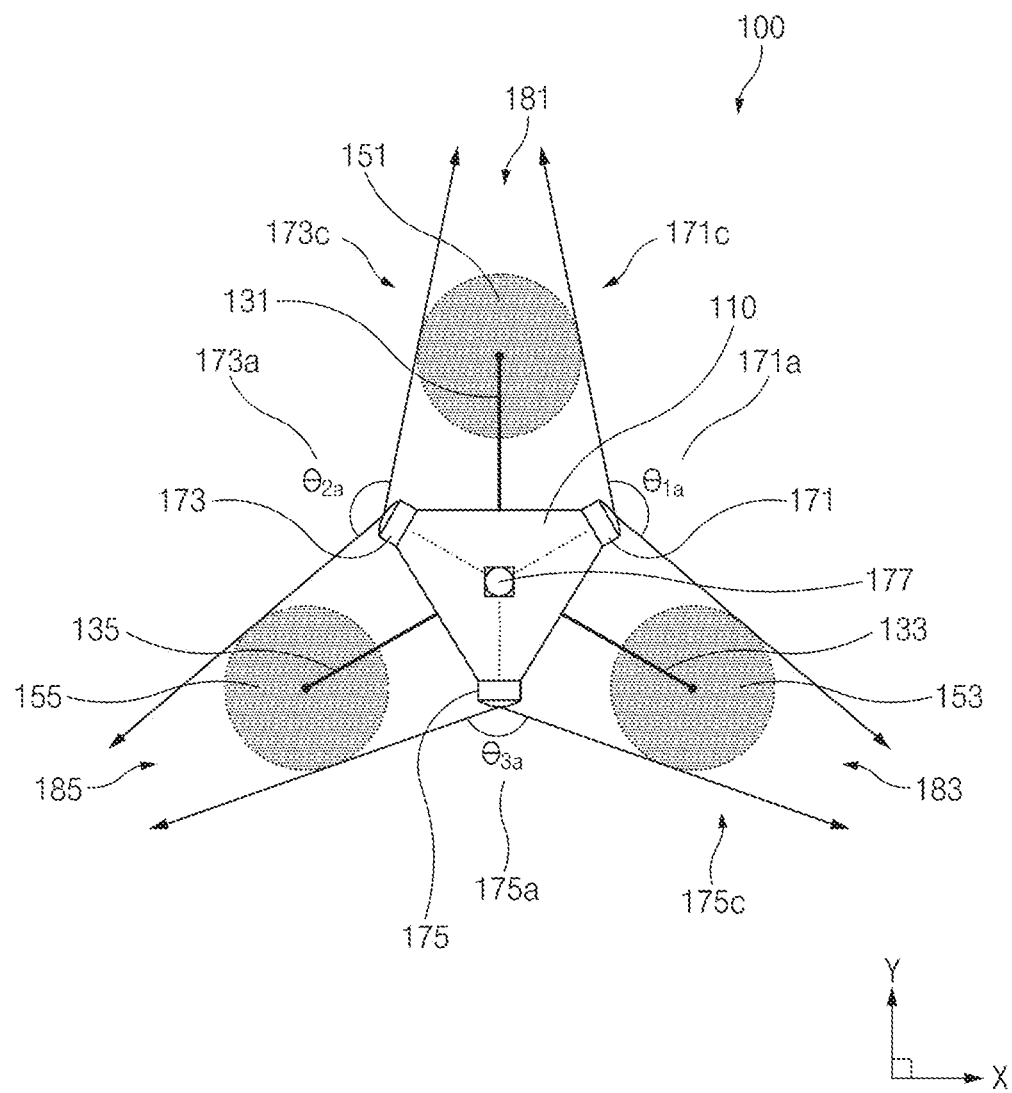
FIG. 1 is a plan view of an unmanned aerial vehicle having a first structure, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing from the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of"

operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or Internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

Figure 2:
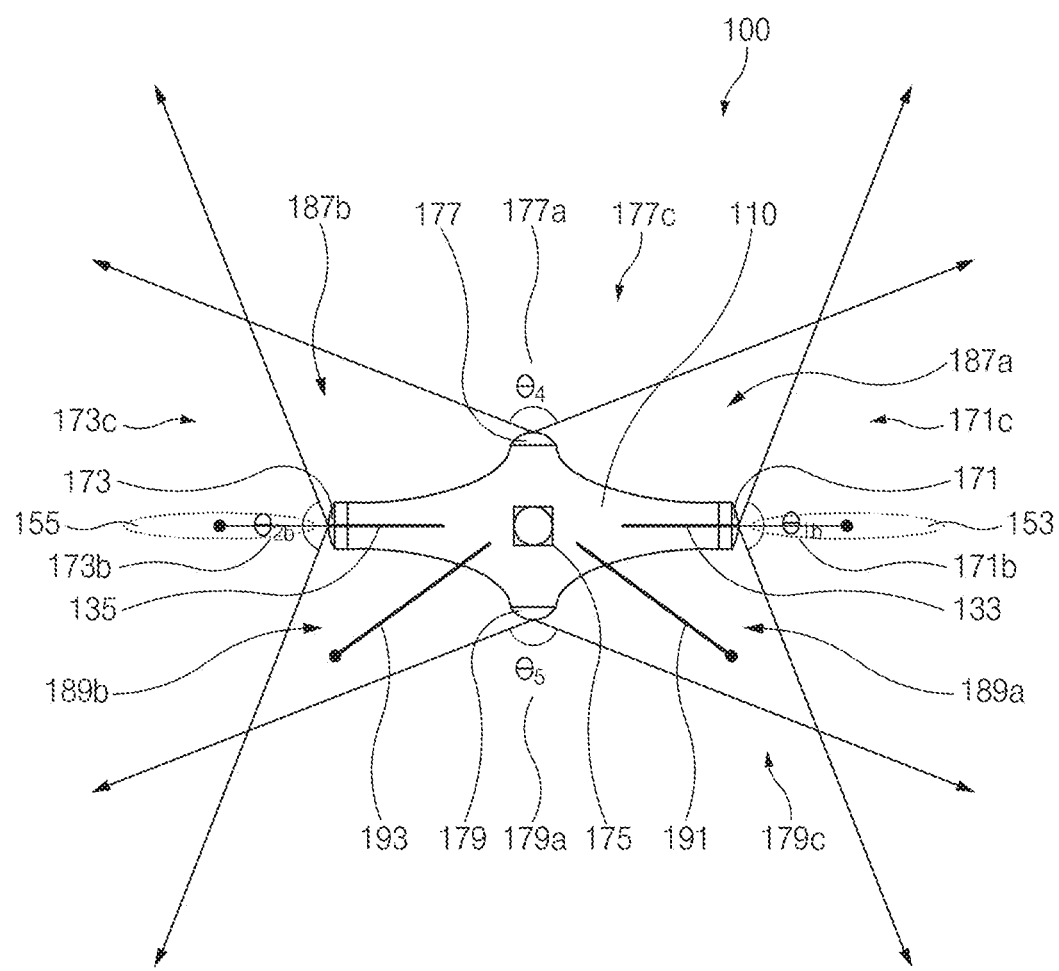
FIG. 2 is a front view of an unmanned aerial vehicle having a first structure, according to an embodiment.

FIG. 1 is a plan view of an unmanned aerial vehicle having a first structure, according to an embodiment. FIG. 2 is a front view of an unmanned aerial vehicle having a first structure, according to an embodiment.

Referring to FIGS. 1 and 2, an unmanned aerial vehicle 100 (e.g., drone) may include a main body 110 (or housing), at least one propeller connection part (or arm) extending from one side surface of the main body 110 by a specified length, at least one propeller connected to the propeller connection part, and at least one camera mounted on one surface of the main body 110.

The main body 110 may include a first surface (e.g., upper surface), a second surface (e.g., lower surface), and a side surface at least partly surrounding space between the first surface and the second surface. According to an embodiment, the first surface and the second surface may be provided in the same or similar shape. For example, when the first surface is provided as a triangle, the second surface may also be provided as a triangle. For another example, when the first surface is provided as a square, the second surface may also be provided as a square. However, the shape of the main body 110 is not limited thereto. According to various embodiments, the shape of the main body 110 may be provided differently depending on the number of propellers, the number of cameras, or the like.

According to an embodiment, at least one module for camera control and image processing and at least one module for flight control may be disposed inside the main body 110. For example, at least one processor, a memory, a motor, a sensor module, or the like may be disposed inside the main body 110. In some embodiments, a communication module for communicating with an external electronic device may be further disposed inside the main body 110.

The processor may include one or more of a central processing unit (CPU), an application processor (AP), or a communication processor (CP). The processor may perform operations or data processing associated with control and/or communication of at least another component of the unmanned aerial vehicle 100.

According to an embodiment, the processor may correct an image captured through at least one camera and may store the corrected image in the memory. Moreover, the processor may control the operation of the motor to control the flight of the unmanned aerial vehicle 100.

The memory may include a volatile memory and/or a nonvolatile memory. For example, the memory may store commands or data associated with at least one other component(s) of the unmanned aerial vehicle 100. According to an embodiment, the memory may store software and/or a program.

According to an embodiment, the memory may store the image captured through at least one camera. Also, the memory may store motion information (e.g., sensing data) of the unmanned aerial vehicle 100 obtained through the sensor module.

The motor may rotate the rotation axis of the motor when power is applied. The propeller of the unmanned aerial vehicle 100 may be rotated due to rotation of the rotation axis.

For example, the sensor module may measure a physical quantity or may sense an operation status of the unmanned aerial vehicle 100. The sensor module may convert the measured or sensed information into an electrical signal. The sensor module may include a gyro sensor, an acceleration sensor, a barometric pressure sensor, or the like. The sensor module may further include a control circuit for controlling at least one or more sensors that belong to the sensor module.

The communication module may establish communication between the unmanned aerial vehicle 100 and an external electronic device. For example, the communication module may connect to a network through wireless communications or wired communications to communicate with the external electronic device.

The wireless communication may include at least one of, for example, a long-term evolution (LTE), an LTE Advanced (LTE-A), a code division multiple access (CDMA), a wideband CDMA (WCDMA), a universal mobile telecommunications system (UMTS), a wireless broadband (WiBro), a global system for mobile communications (GSM), or the like, as a cellular communication protocol. In addition, the wireless communication may include, for example, the short range communication. The short range communication may include at least one of, for example, wireless fidelity (Wi-Fi), Bluetooth, near field communication (NFC), global navigation satellite system (GNSS), or the like.

The GNSS may include at least one of a global positioning system (GPS), a global navigation satellite system (Glonass), a Beidou Navigation Satellite System (hereinafter referred to as "Beidou"), or a European global satellite-based navigation system (Galileo), based on a use area or a bandwidth. Hereinafter, "GPS" and "GNSS" may be used interchangeably in the disclosure. The wired communication may include at least one of, for example, a universal serial bus (USB), a high definition multimedia interface (HDMI), a recommended standard 232 (RS-232), a plain old telephone service (POTS), or the like. For example, the network may include at least one of telecommunications networks, for example, a computer network (e.g., local area network (LAN) or wide area network (WAN)), Internet, or a telephone network.

The propeller connection part may extend from a side surface of the main body 110 by a specified length and may be provided in a long rod shape. The drawing illustrates that a first propeller connection part 131 extends from the center of the upper side surface of the main body 110, a second propeller connection part 133 extends from the center of the right side surface of the main body 110, and a third propeller connection part 135 extends from the center of the left side surface of the main body 110. The propeller connection part may extend parallel to the side direction (e.g., x-axis or y-axis direction) of the main body 110.

The propeller may be connected to one end of the propeller connection part. The drawing illustrates that a third propeller 155 is connected to one end of the third propeller connection part 135 when a first propeller 151 is connected to one end of the first propeller connection part 131 and a second propeller 153 is connected to one end of the second propeller connection part 133. The direction of the rotation axis of the propeller may face the vertical direction (e.g., z-axis direction) of the main body 110.

According to an embodiment, the camera may be disposed at a point where different side surfaces of the main body 110 meet, that is, a first surface (e.g., upper surface) of the main body 110, and a second surface (e.g., lower surface) of the main body 110. For example, the drawing illustrates a state where a first camera 171 is disposed at the edge where the upper side surface and the right side surface of the main body 110 meet, a state where a second camera 173 is disposed at the edge where the upper side surface and the left side surface of the main body 110 meet, a state where a third camera 175 is disposed at the edge where the left side surface and the right side surface of the main body 110 meet, a state where a fourth camera 177 is disposed on the upper surface of the main body 110, and a state where a fifth camera 179 is disposed on the lower surface of the main body 110.

According to an embodiment, the capture angle (or angle of view) of the camera disposed in the side direction of the main body 110 may be configured such that the propeller on both sides adjacent to the camera is not included in the capture area. For example, a horizontal direction capture angle $\theta_{1a}$ 171a of the first camera 171 may be configured such that the first and second propellers 151 and 153 adjacent to the first camera 171 are not included in a capture area 171c of the first camera 171. A horizontal direction capture angle $\theta_{2a}$ 173a of the second camera 173 may be configured such that the first propeller 151 and the third propeller 155 adjacent to the second camera 173 are not included in a capture area 173c of the second camera 173. A horizontal direction capture angle $\theta_{3a}$ 175a of the third camera 175 may be configured such that the second propeller 153 and the third propeller 155 adjacent to the third camera 175 are not included in a capture area 175c of the third camera 175.

According to an embodiment, the distance between the camera disposed in the side direction of the main body 110 and the center point of the main body 110 may be configured such that the non-capture area (or the shadow area) out of the capture angle is minimized. For example, the distance between the first camera 171 and the center point of the main body 110 may be configured such that a first non-capture area 181 out of the capture angle of the first camera 171 and the second camera 173 and a second non-capture area 183 out of the capture angle of the first camera 171 and the third camera 175 are minimized. Moreover, the distance between the second camera 173 and the center point of the main body 110 may be configured such that the first non-capture area 181 out of the capture angle of the second camera 173 and the first camera 171 and a third non-capture area 185 out of the capture angle of the second camera 173 and the third camera 175 are minimized. Likewise, the distance between the third camera 175 and the center point of the main body 110 may be configured such that the second non-capture area 183 out of the capture angle of the third camera 175 and the first camera 171 and the third non-capture area 185 out of the capture angle of the third camera 175 and the second camera 173 are minimized.

According to an embodiment, the capture angle of the camera disposed in the vertical direction of the main body 110 may be configured such that the capture area of the camera disposed in the vertical direction partially overlaps with the capture area of the camera disposed in the side direction of the main body 110. For example, a capture angle $\theta_4$ 177a of the fourth camera 177 may be configured such that a capture area 177c of the fourth camera 177 partially overlaps with both the capture area 171c defined by a vertical direction capture angle $\theta_{1b}$ 171b of the first camera 171 and the capture area 173c defined by a vertical direction capture angle $\theta_{2b}$ 173b of the second camera 173. Moreover, a capture angle $\theta_5$ 179a of the fifth camera 179 may be configured such that a capture area 179c of the fifth camera 179 partially overlaps with both the capture area 171c defined by the vertical direction capture angle $\theta_{1b}$ 171b of the first camera 171 and the capture area 173c defined by the vertical direction capture angle $\theta_{2b}$ 173b of the second camera 173.

According to an embodiment, the capture angle of the camera disposed in the vertical direction of the main body 110 may be configured such that the non-capture area, which is an area out of the capture angle, is minimized. For example, a capture angle 177a of the fourth camera 177 may be configured such that a fourth non-capture area 187a out of the capture angles of the fourth camera 177 and the first camera 171, and a fifth non-capture area 187b out of the capture angles of the fourth camera 177 and the second camera 173 are minimized. Moreover, a capture angle 179a of the fifth camera 179 may be configured such that a sixth non-capture area 189a out of the capture angles of the fifth camera 179 and the first camera 171, and a seventh non-capture area 189b out of the capture angles of the fifth camera 179 and the second camera 173 are minimized.

According to an embodiment, at least one landing member (e.g., landing gear) may be disposed on the lower surface of the main body 110. The drawing illustrates that a first landing member 191 and a second landing member 193 are disposed on a lower surface of the main body 110. According to various embodiments, the landing member may be provided in a long rod shape extending from one point of the main body 110. In this case, at least two landing members may be provided. In addition, the two or more landing members may support the main body 110 by forming a specified angle. In some embodiments, the landing member may be provided in the shape of a plate and may be connected to a connection member extending from a lower surface of the main body 110.

According to an embodiment, the landing member disposed on the lower surface of the main body 110 may be positioned within the non-capture area. For example, the first landing member 191 may be positioned within the sixth non-capture area 189a, and the second landing member 193 may be positioned within the seventh non-capture area 189b.

Figure 3:
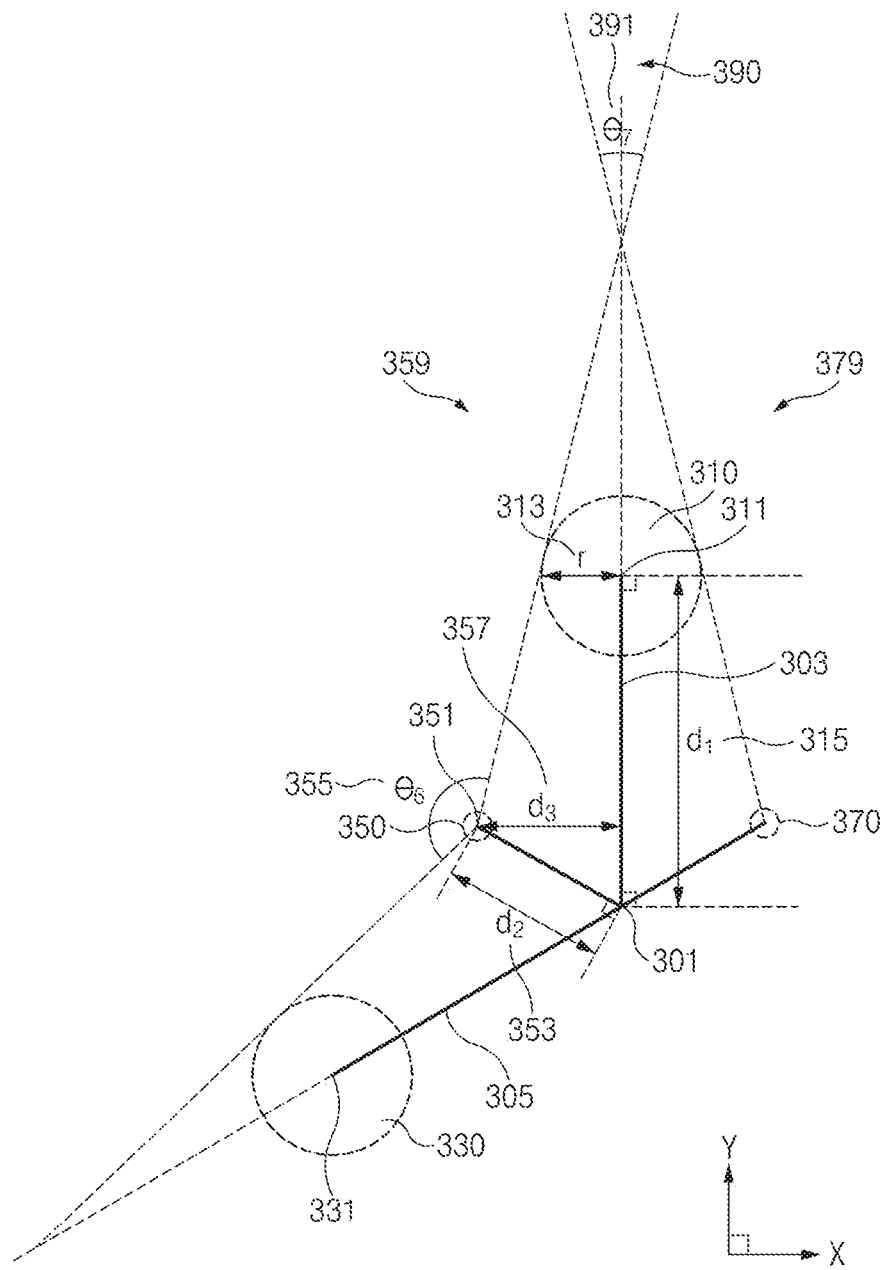
FIG. 3 is a view for describing an unmanned aerial vehicle and a capture area of a camera mounted on a side of the unmanned aerial vehicle, according to an embodiment.

FIG. 3 is a view for describing an unmanned aerial vehicle and a capture area of a camera mounted on a side of the unmanned aerial vehicle, according to an embodiment.

Referring to FIG. 3, in the propeller of an unmanned aerial vehicle (e.g., the unmanned aerial vehicle 100), a distance from a center point 301 of the unmanned aerial vehicle may be greater than the radius of the propeller (e.g., the distance from the center point of the propeller to the wing tip). For example, a first propeller 310 (e.g., the first propeller 151) may be spaced apart from the center point 301 of the unmanned aerial vehicle by a first distance $d_1$ 315, and a radius 'r' 313 of the first propeller 310 may be less than a first distance 315.

The camera mounted on the side of the unmanned aerial vehicle may be spaced apart from the center point 301 of the unmanned aerial vehicle by a specified distance. For example, a first camera 350 (e.g., the first camera 171) may be spaced from the center point 301 of the unmanned aerial vehicle by a second distance dz.

According to an embodiment, the camera mounted on the side of the unmanned aerial vehicle may be disposed such that a part (e.g., a propeller) of the unmanned aerial vehicle does not enter the capture area. For example, the camera mounted on the side of the unmanned aerial vehicle may be disposed such that the first propeller 310 and a second propeller 330 (e.g., the second propeller 153), which are adjacent to the first camera 350, do not enter a capture area 359 defined by a capture angle $\theta_6$ 355 of the first camera 350.

A vertical distance $d_3$ 357 between a line 303 connecting the center point 301 of the unmanned aerial vehicle to a center point 311 of the first propeller 310 and the first camera 350 may be set to be greater than a radius 313 of the first propeller 310 and may be set to be less than the distance 315 from the center point 301 of the unmanned aerial vehicle to the first propeller 310, such that the first propeller 310 adjacent to the first camera 350 does not enter the capture area 359 of the first camera 350. Likewise, the vertical distance between a line 305 connecting the center point 301 of the unmanned aerial vehicle to a center point 331 of the second propeller 330 and the first camera 350 may be set to be greater than the radius of the second propeller 330 and may be set to be less than the distance from the center point 301 of the unmanned aerial vehicle to the second propeller 330, such that the second propeller 330 adjacent to the first camera 350 does not enter the capture area 359 of the first camera 350.

In the above description, the location relationship between the first camera 350 and each of the first propeller 310 and the second propeller 330, which are adjacent to the first camera 350 are described. However, a second camera 370 (e.g., the second camera 173) and a third camera (not illustrated) (e.g., the third camera 175) may be disposed identically or similarly.

According to an embodiment, capture areas defined by the capture angles of adjacent cameras may partially overlap with each other. For example, the first capture area 359 defined by the capture angle of the first camera and a second capture area 379 defined by the capture angle of the second camera may partially overlap with each other. The drawing illustrates that the first capture area 359 and the second capture area 379 form an overlapped area 390 at the outside of the first propeller 310. According to an embodiment, an overlap angle $\theta_7$ 391 of the overlapped area 390 may be formed to be greater than 10 degrees.

Figure 4:
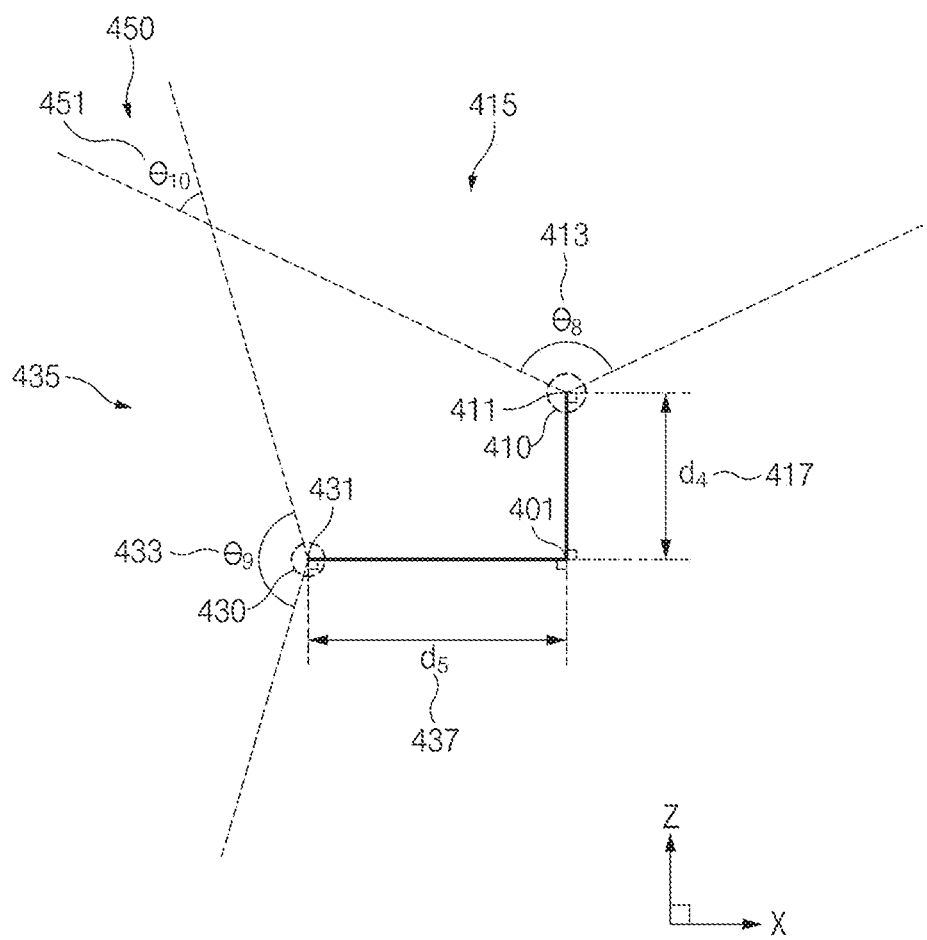
FIG. 4 is a view for describing an unmanned aerial vehicle and a capture area of a camera mounted on an upper or lower side of the unmanned aerial vehicle, according to an embodiment.

FIG. 4 is a view for describing an unmanned aerial vehicle and a capture area of a camera mounted on an upper or lower side of the unmanned aerial vehicle, according to an embodiment.

Referring to FIG. 4, the camera mounted on the upper or lower side of the unmanned aerial vehicle (e.g., the unmanned aerial vehicle 100) may be spaced apart from a center point 401 of the unmanned aerial vehicle by a specified distance. For example, a distance $d_4$ 417 from a center point 411 of a first camera 410 (e.g., the fourth camera 177) disposed on the upper side of the unmanned aerial vehicle to the center point 401 of the unmanned aerial vehicle may be set to a specified size.

The capture area defined by the capture angle of the camera mounted on the upper or lower side of the unmanned aerial vehicle may partially overlap with the capture area defined by the capture angle of the camera mounted on the side of the unmanned aerial vehicle. For example, a first capture area 415 defined by a capture angle $\theta_8$ 413 of the first camera 410 may partially overlap with a second capture area 435 defined by a capture angle $\theta 9$ 433 of a second camera 430 (e.g., the first camera 171, the second camera 173, or the third camera 175) disposed spaced from the center point 401 of the unmanned aerial vehicle by a specified distance d5 437 in the side direction. In the drawing, the first capture area 415 and the second capture area 435 may partially overlap with each other so as to form an overlapped area 450. According to an embodiment, an overlap angle $\theta_{10}$ 451 of the overlapped area 450 may be formed to be greater than 10 degrees.

An embodiment is exemplified in FIGS. 1 and 2 as the number of propellers of the unmanned aerial vehicle is three. However, the number of propellers of the unmanned aerial vehicle and the number of installed cameras is not limited thereto. According to various embodiments, the number of propellers of the unmanned aerial vehicle may be greater than four, and the number of installed cameras may be greater than five.

Figure 5A:
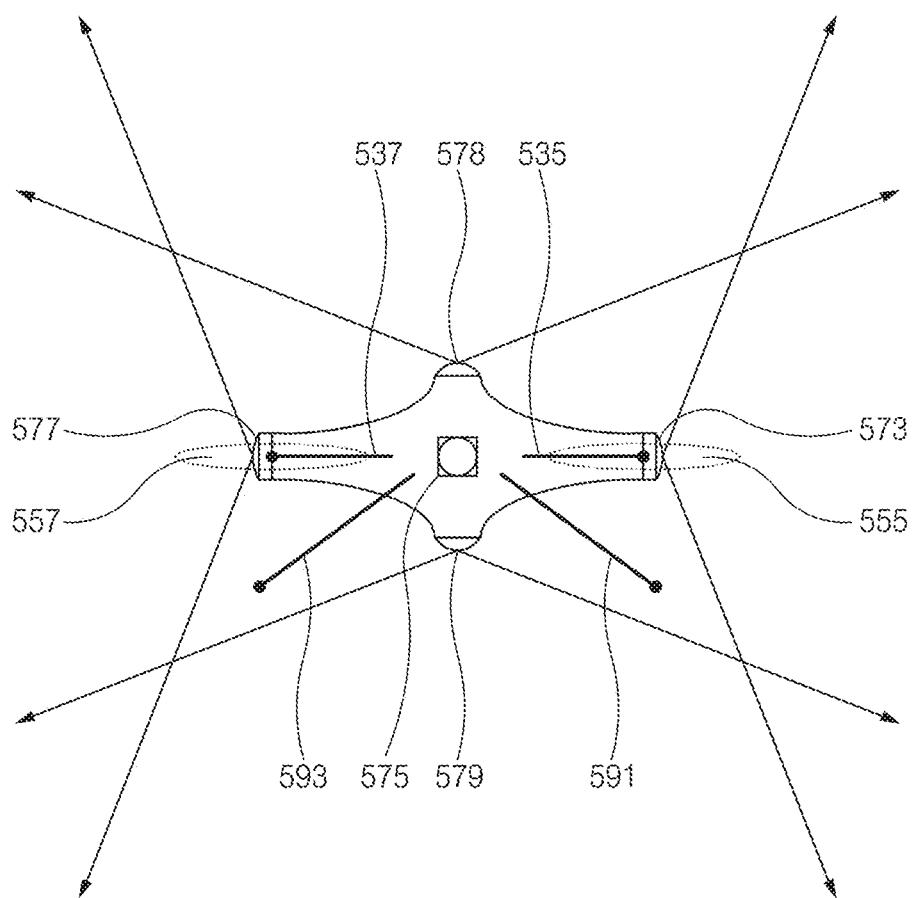
FIG. 5A is a plan view of an unmanned aerial vehicle having a second structure, according to an embodiment.
Figure 5B:
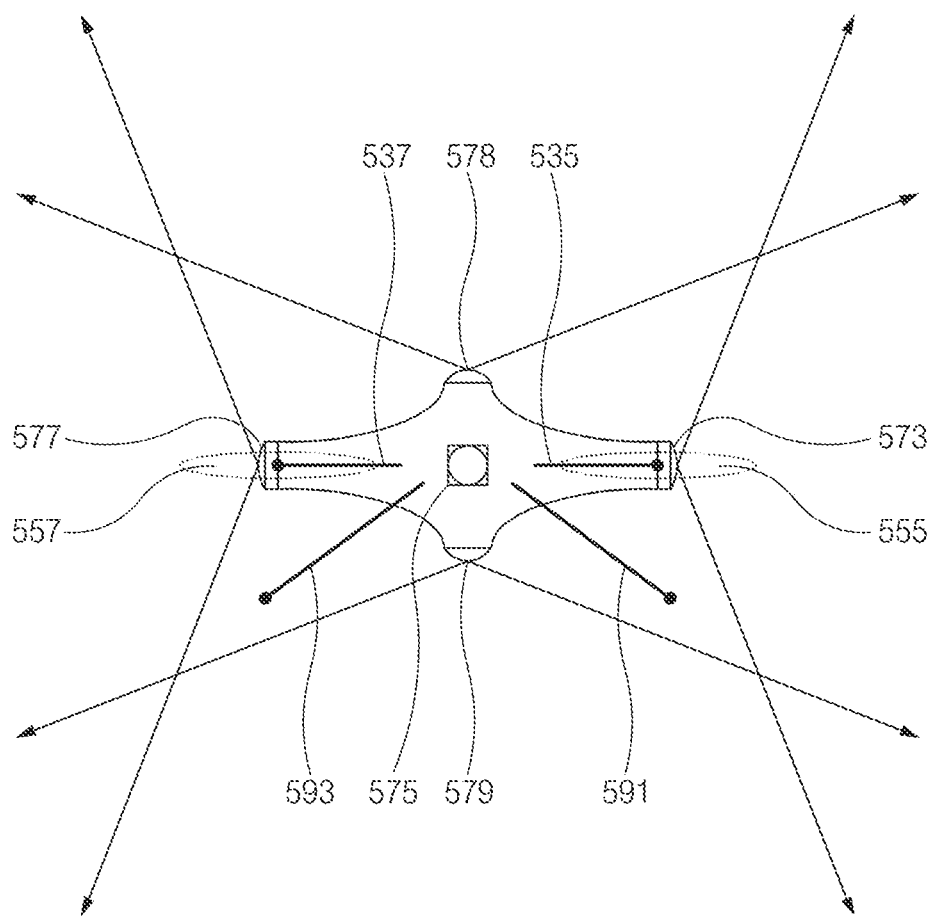
FIG. 5B is a front view of an unmanned aerial vehicle having a second structure, according to an embodiment.

FIG. 5A is a plan view of an unmanned aerial vehicle having a second structure, according to an embodiment. FIG. 5B is a front view of an unmanned aerial vehicle having a second structure, according to an embodiment. Hereinafter, the description the same as or similar to the above-mentioned description will be omitted.

Referring to FIGS. 5A and 5B, an unmanned aerial vehicle 500 may have four propellers. For example, the unmanned aerial vehicle 500 may include a first propeller 551 connected to a first propeller connection portion 531 extending from the upper left side of a main body 510, a second propeller 553 connected to a second propeller connection part 533 extending from the upper right side of the main body 510, a third propeller 555 connected to a third propeller connection part 535 extending from the lower right side of the main body 510, and a fourth propeller 557 connected to a fourth propeller connection part 537 extending from the lower left side of the main body 510. In this case, the main body 510 of the unmanned aerial vehicle 500 may be provided substantially in the form of a cross. For example, a first surface (e.g., an upper surface) and a second surface (e.g., a lower surface) of the main body 510 may be provided substantially in the form of a cross.

A camera may be disposed at the point where the different side surfaces of the main body 510 meet and on the upper or lower surface of the main body 510. In the drawing, a first camera 571 is disposed at an edge (e.g., an upper-side tip portion of a cross) where the upper right side surface and the upper left side surface of the main body 510 meet; a second camera 573 is disposed at an edge (e.g., the right-side tip portion of the cross) where the upper right side surface and the lower right side surface of the main body 510 meet; a third camera 575 is disposed at an edge (e.g., the lower-side tip portion of the cross) where the lower right side surface and the lower left side surface of the main body 510 meet; and a fourth camera 577 may be disposed at an edge (e.g., the left-side tip portion of the cross) where the lower left side surface and the upper left side surface of the main body 510 meet. A fifth camera 578 may be disposed on the upper surface of the main body 510, and a sixth camera 579 may be disposed on the lower surface of the main body 510.

According to an embodiment, the capture angle of the camera disposed in the side direction of the main body 510 may be configured such that the propeller on both sides adjacent to the camera is not included in the capture area. Furthermore, the distance between the camera disposed in the side direction of the main body 510 and the center point of the main body 510 may be configured such that the non-capture area out of the capture angle is minimized.

According to an embodiment, the capture angle of the camera disposed in the vertical direction of the main body 510 may be configured such that the capture area of the camera disposed in the vertical direction partially overlaps with the capture area of the camera disposed in the side direction of the main body 510. Moreover, the capture angle of the camera disposed in the vertical direction of the main body 510 may be configured such that the non-capture area, which is an area out of the capture angle, is minimized.

According to an embodiment, at least one landing member may be disposed on the lower surface of the main body 510. The drawing illustrates that a first landing member 591 and a second landing member 593 are disposed on a lower surface of the main body 510. However, the number of landing members is not limited thereto. In some embodiments, at least another landing member may be further disposed on the lower surface of the main body 510.

Figure 6A:
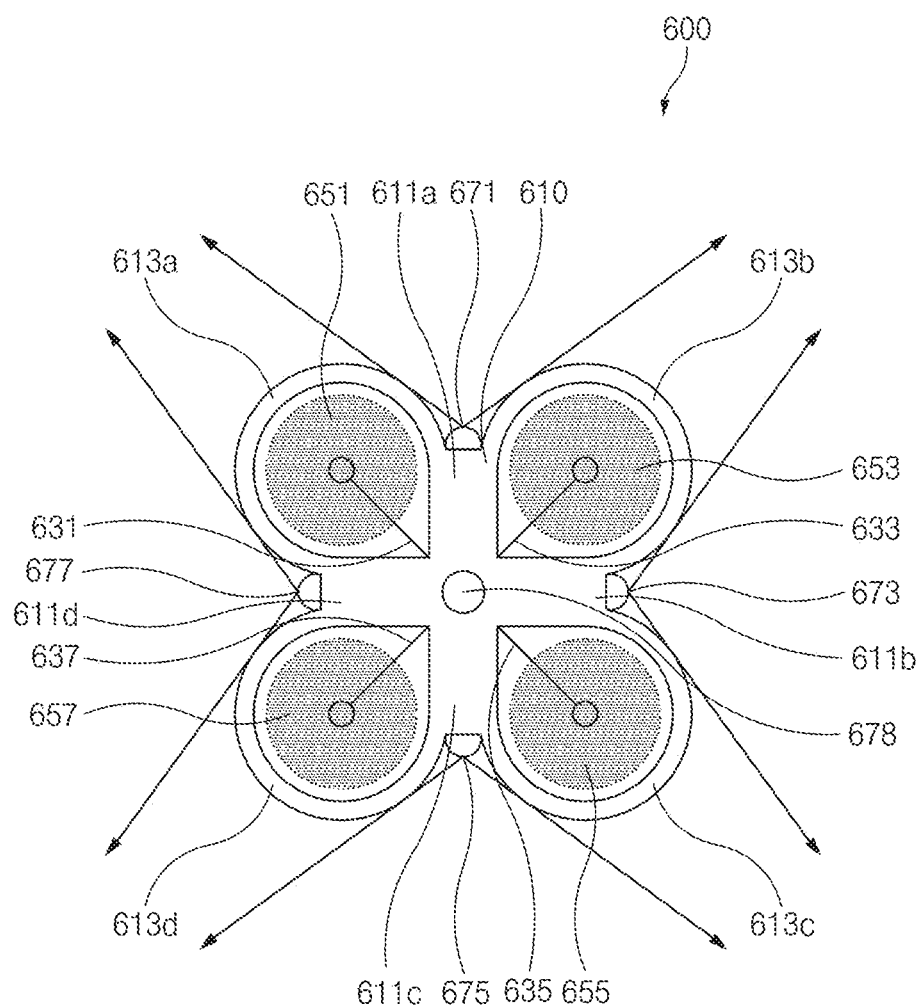
FIG. 6A is a plan view of an unmanned aerial vehicle having a third structure, according to an embodiment.
Figure 6B:
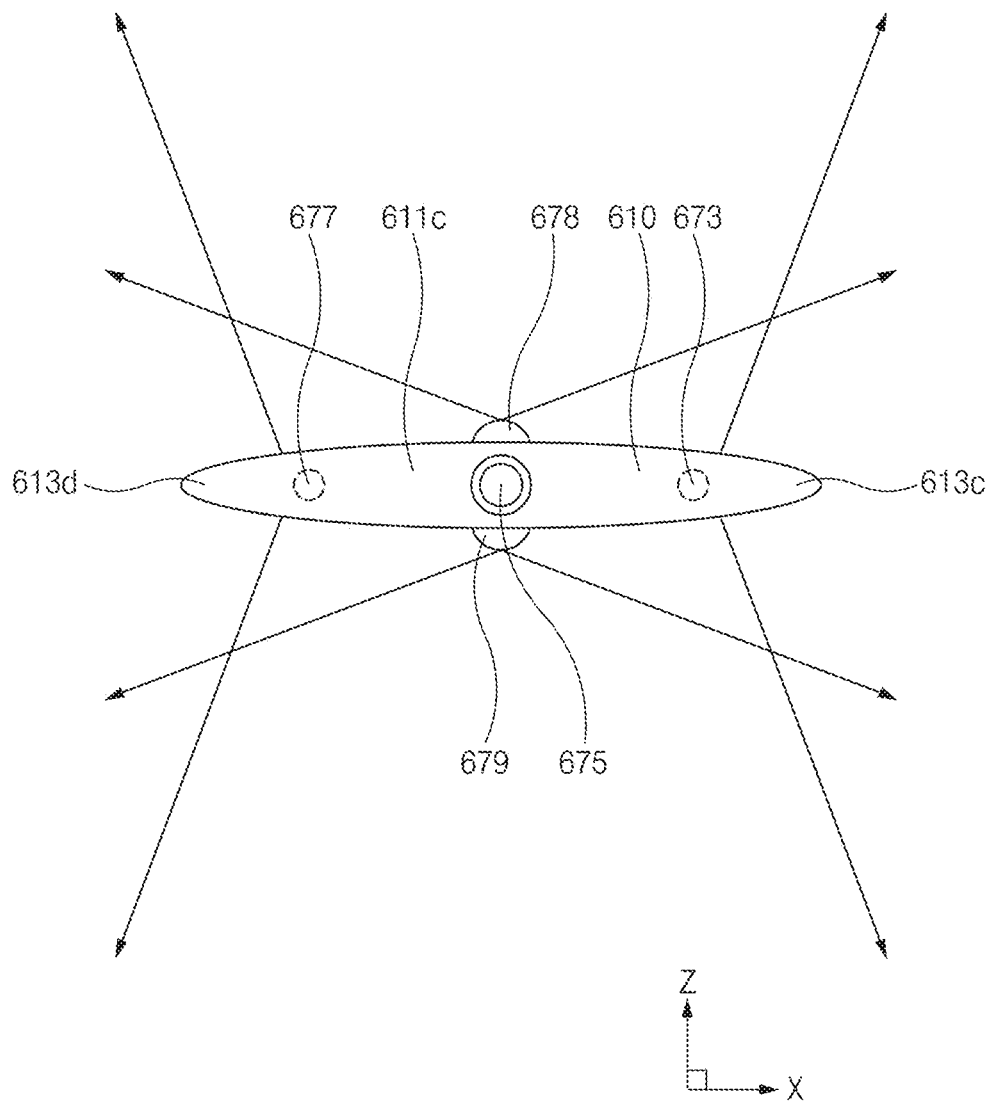
FIG. 6B is a front view of an unmanned aerial vehicle having a third structure, according to an embodiment.

FIG. 6A is a plan view of an unmanned aerial vehicle having a third structure, according to an embodiment. FIG. 6B is a front view of an unmanned aerial vehicle having a third structure, according to an embodiment.

Referring to FIGS. 6A and 6B, an unmanned aerial vehicle 600 may be provided such that a main body 610 surrounds a propeller. For example, a first propeller 651, a second propeller 653, a third propeller 655, and a fourth propeller 657 of the unmanned aerial vehicle 600 may be disposed inside the main body 610. According to an embodiment, the main body 610 may be provided such that a center part is in the form of a cross. For example, the center part of the main body 610 may be provided such that an upper center part 611a extending upward from the center point of the main body 610, a right center part 611b extending to the right, a lower center part 611c extending to the lower side, and a left center part 611d extending to the left are substantially in the form of a cross.

According to an embodiment, the main body 610 may include an upper left side part 613a extending from a part of the upper center part 611a to a part of the left center part 611d, an upper right side part 613b extending from a part of the upper center part 611a to a part of the right center part 611b, a lower right side part 613c extending from a part of the right center part 611b to a part of the lower center part 611c, and a lower left side part 613d extending from a part of the lower center part 611c to a part of the left center part 611d. The upper left side part 613a, the upper right side part 613b, the lower right side part 613c, and the lower left side part 613d may be provided in a protruded shape in the side direction of the main body 610. For example, the rims of the upper left side part 613a, the upper right side part 613b, the lower right side part 613c, and the lower left side part 613d may be provided in the form of an arc disposed spaced from the center point of the main body 610 by a specified distance.

According to an embodiment, the first propeller 651 may be connected to a first propeller connection part 631 extending from a point where the upper center part 611a and the left center part 611d of the main body 610 meet each other; the second propeller 653 may be connected to a second propeller connection part 633 extending from a point where the upper center part 611a and the right center part 611b of the main body 610 meet each other; the third propeller 655 may be connected to a third propeller connection part 635 extending from a point where the right center part 611b and the lower center part 611c of the main body 610 meet each other; and the fourth propeller 657 may be connected to a fourth propeller connection part 637 extending from a point where the lower center part 611c and the left center part 611d of the main body 610 meet each other.

According to an embodiment, a camera may be disposed at the upper center part 611a, the right center part 611b, the lower center part 611c, the left center part 611d, the upper surface, and the lower surface of the main body 610. For example, a first camera 671 may be disposed at the end of the upper center part 611a of the main body 610; a second camera 673 may be disposed at the end of the right center part 611b of the main body 610; a third camera 675 is disposed at the end of the lower center part 611c of the main body 610; and a fourth camera 677 may be disposed at the end of the left center part 611d of the main body 610. A fifth camera 678 may be disposed on the upper surface of the main body 610, and a sixth camera 679 may be disposed on the lower surface of the main body 610.

Figure 7A:
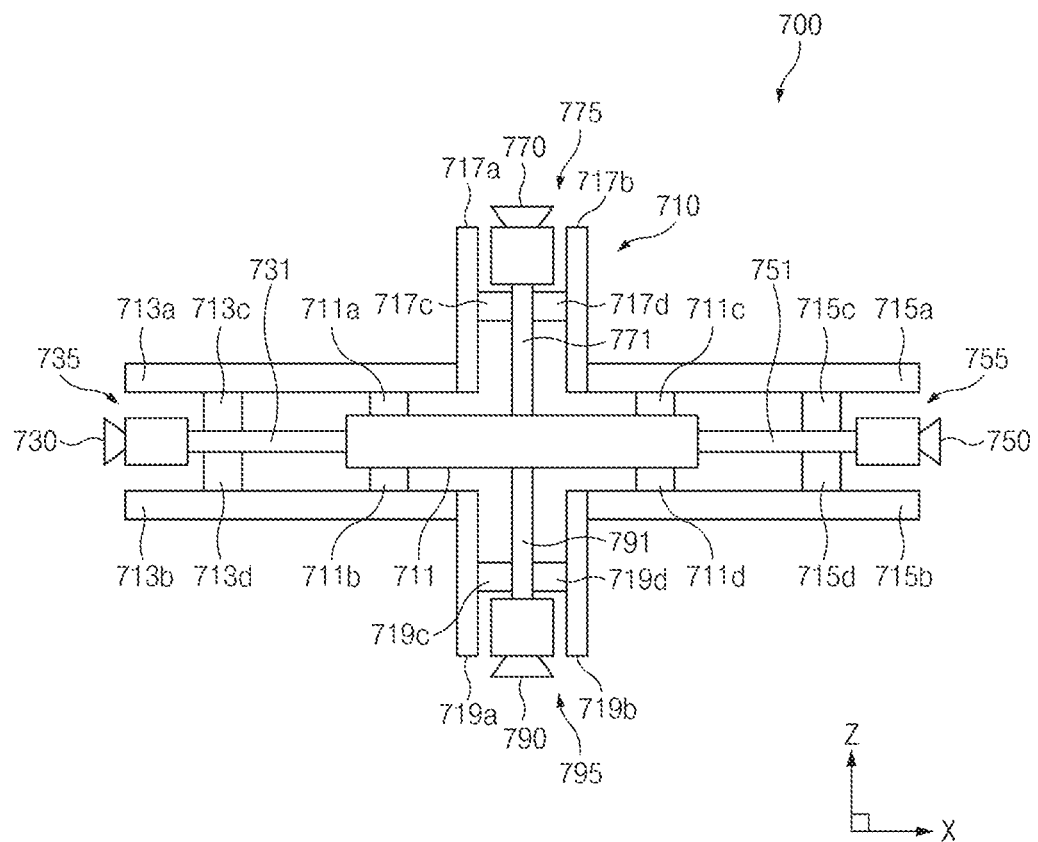
FIG. 7A is a view for describing an internal structure of an unmanned aerial vehicle having a fourth structure, according to an embodiment.
Figure 7B:
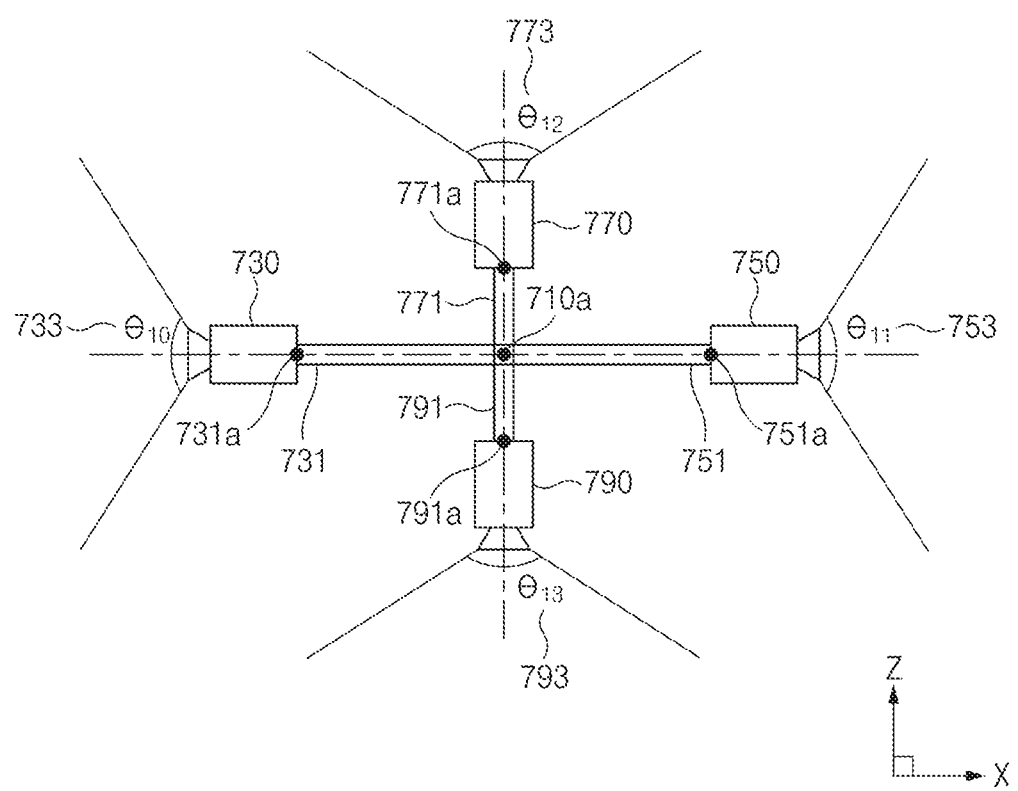
FIG. 7B is a view for describing a camera location of an unmanned aerial vehicle having a fourth structure, according to an embodiment.

FIG. 7A is a view for describing an internal structure of an unmanned aerial vehicle having a fourth structure, according to an embodiment. FIG. 7B is a view for describing a camera location of an unmanned aerial vehicle having a fourth structure, according to an embodiment.

Referring to FIGS. 7A and 7B, a main body 710 of an unmanned aerial vehicle 700 may be implemented with at least one frame. For example, as illustrated, the main body 710 may include an upper left horizontal frame 713a and an upper right horizontal frame 715a forming a part of an upper surface, a lower left horizontal frame 713b and a lower right horizontal frame 715b forming a part of a lower surface, an upper left vertical frame 717a and an upper right vertical frame 717b forming an upper end, and a lower left vertical frame 719a and a lower right vertical frame 719b forming a lower end. According to an embodiment, at least one frame constituting the main body 710 may fix at least one of a propeller and a motor that rotates the propeller.

According to an embodiment, in the unmanned aerial vehicle 700, the at least one camera may be disposed inside the main body 710 and may be exposed to the outside through an opening formed at least one surface of the main body 710. For example, the at least one camera may be located at the inner end of a frame constituting the main body 710. For example, a camera disposed in the side direction of the main body 710 is disposed between the upper left horizontal frame 713a and the lower left horizontal frame 713b or between the upper right horizontal frame 715a and the lower right horizontal frame 715b; a camera disposed in a vertical direction of the main body 110 may be disposed between the upper left vertical frame 717a and the upper right vertical frame 717b or between the lower left vertical frame 719a and the lower right vertical frame 719b. The drawing illustrates that a first camera 730 is disposed between the end of the upper left horizontal frame 713a and the end of the lower left horizontal frame 713b and is exposed to the outside through a left opening 735 formed on the left side surface of the main body 710, a second camera 750 is disposed between the end of the upper right horizontal frame 715a and the end of the lower right horizontal frame 715b and is exposed to the outside through a right opening 755 formed on the right side surface of the main body 710, a third camera 770 is disposed between the end of the upper left vertical frame 717a and the end of the upper right vertical frame 717b and is exposed to the outside through an upper end opening 775 formed in the upper end of the main body 710, and a fourth camera 790 is disposed between the end of the lower left vertical frame 719a and the lower right vertical frame 719b and is exposed to the outside through a lower end opening 795 formed at the lower end of the main body 710.

According to an embodiment, the camera disposed inside the frame constituting the main body 710 may be connected to a camera connection part (or arm) extending from one surface of a circuit mounting part 711 located inside the frame. For example, as illustrated, the first camera 730 may be connected to a left camera connection part 731 extending from a part of the left side surface of the circuit mounting part 711; the second camera 750 may be connected to a right camera connection part 751 extending from a part of the right side surface of the circuit mounting part 711; the third camera 770 may be connected to an upper camera connection part 771 extending from the upper surface of the circuit mounting part 711; and the fourth camera 790 may be connected to a lower camera connection part 791 extending from the lower surface of the circuit mounting part 711.

According to an embodiment, the cameras installed in the unmanned aerial vehicle 700 may be disposed such that the extension lines, which divide the centers of the capture angles of the cameras, meet each other at a center point 710a of the main body 710. For example, an extension line (e.g., a line that straightly passes through a connection point 731a of the first camera 730 and the center part of a capture angle 733 of the first camera 730) dividing the center of the capture angle $\theta_{10}$ 733 of the first camera 730, an extension line (e.g., a line that straightly passes through a connection point 751a of the second camera 750 and the center part of a capture angle 753 of the second camera 750) dividing the center of the capture angle $\theta_{11}$ 753 of the second camera 750, an extension line (e.g., a line that straightly passes through a connection point 771a of the third camera 770 and the center part of a capture angle 773 of the third camera 770) dividing the center of the capture angle $\theta_{12}$ 773 of the third camera 770, and an extension line (e.g., a line that straightly passes through a connection point 791a of the fourth camera 790 and the center part of a capture angle 793 of the fourth camera 790) dividing the center of the capture angle $\theta_{13}$ 793 of the fourth camera 790 may intersect each other at the center point 710a of the main body 710.

According to another embodiment, the cameras installed in the unmanned aerial vehicle 700 may be disposed such that an extension line dividing the center of the capture angle of each of the cameras may be parallel to a line connecting the center point 710a of main body 710 to the connection point of each camera. For example, the extension line dividing the center of the capture angle 733 of the first camera 730 may be parallel to the line connecting the center point 710a of the main body 710 and the connection point 731a of the first camera 730; the extension line dividing the center of the capture angle 753 of the second camera 750 may be parallel to the line connecting the center point 710a of the main body 710 and the connection point 751a of the second camera 750; the extension line dividing the center of the capture angle 773 of the third camera 770 may be parallel to the line connecting the center point 710a of the main body 710 and the connection point 771a of the third camera 770; and the extension line dividing the center of the capture angle 793 of the fourth camera 790 may be parallel to the line connecting the center point 710a of the main body 710 and the connection point 791a of the fourth camera 790.

According to an embodiment, the above-described camera connection part may be fixed to a frame constituting the main body 710 through a shock absorbing member (e.g., a damper). For example, the left camera connection part 731 may be fixed to the upper left horizontal frame 713a and the lower left horizontal frame 713b through a first damper 713c and a second damper 713d, respectively; the right camera connection part 751 may be fixed to the upper right horizontal frame 715a and the lower right horizontal frame 715b through a third damper 715c and a fourth damper 715d, respectively; the upper camera connection part 771 may be fixed to the upper left vertical frame 717a and the upper right vertical frame 717b through a fifth damper 717c and a sixth damper 717d, respectively; and the lower camera connection part 791 may be fixed to the lower left vertical frame 719a and the lower right vertical frame 719b through a seventh damper 719c and a eighth damper 719d, respectively. For another example, the circuit mounting part 711 may also be fixed to the frame comprising the main body 710 through a shock absorbing member. For example, the circuit mounting part 711 may be fixed to the upper left horizontal frame 713a, the lower left horizontal frame 713b, the upper right horizontal frame 715a, and the lower right horizontal frame 715b through a ninth damper 711a, a tenth damper 711b, an eleventh damper 711c, and a twelfth damper 711d, respectively.

According to an embodiment, the above-described dampers may simultaneously transmit the shaking or vibration of the main body 710 to a plurality of cameras installed in the unmanned aerial vehicle 700. For example, the shaking or vibration occurring at one point of the main body 710 may be transmitted to the first camera 730, the second camera 750, the third camera 770, and the fourth camera 790 with the same or similar size. Accordingly, even though the main body 710 is shaken, there is no relative shaking between the plurality of cameras, thereby reducing the processing of shake correction for the images when images obtained from a plurality of cameras are stitched.

According to an embodiment, the shape and connection structure of each of the dampers described above may vary depending on the weight and the center of gravity of the circuit mounting part 711, each camera connection part extending from the circuit mounting part 711, a camera connected to each camera connection part, and the like. For example, the damper connected to the upper end frame among frames constituting the main body 710 may be fixed in a hanging form, and the damper connected to the lower end frame among the frames may be fixed in a pressed form. For example, the first damper 713c and the ninth damper 711a may be fixed to the upper left horizontal frame 713a in a hanging form; the third damper 715c and the eleventh damper 711c may be fixed to the upper right horizontal frame 715a in a hanging form; the second damper 713d and the tenth damper 711b may be fixed to the lower left horizontal frame 713b in a pressed form; and the fourth damper 715d and the twelfth damper 711d may be fixed to the lower right horizontal frame 715b in a pressed form. For another example, a damper connected to a vertical frame among frames constituting the main body 710 may be fixed in an attached form. For example, the fifth damper 717c may be fixed to the upper left vertical frame 717a in an attached form; the sixth damper 717d may be fixed to the upper right vertical frame 717b in an attached form; the seventh damper 719c may be fixed to the lower left vertical frame 719a in an attached form; and the eighth damper 719d may be fixed to the lower right vertical frame 719b in an attached form.

According to an embodiment, the length and shape of the camera connection part may be assigned in consideration of the size and shape of the frame constituting the main body 710, the diameter of a propeller, the capture angle of a camera, and the like. For example, the length and shape of the camera connection part may be determined such that the frame and propeller are located in the non-capture area of a camera (an area outside the capture angle of the camera). In addition, the camera connection part may further include a structure for connection to a camera driving circuit, a battery fixing part for fixing a battery, or the like; when the battery is disposed in the frame, the camera connection part may further include a structure for connection to the battery.

The circuit mounting part 711 may include at least one of a camera driving circuit for driving the camera, an image processing circuit for processing the image obtained from the camera, and a flight control circuit for flight control. For example, the circuit mounting part 711 may include a processor, a memory, a sensor module, or the like. For another example, the circuit mounting part 711 may further include a communication module for communicating with an external electronic device.

Figure 7C:
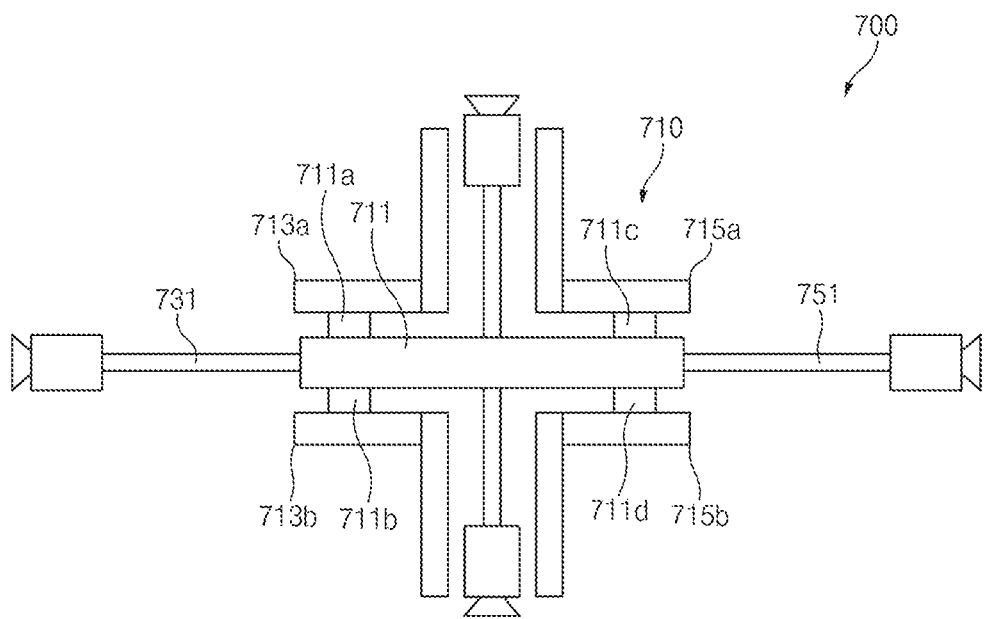
FIG. 7C is a view for describing an internal structure of an unmanned aerial vehicle having a fifth structure, according to an embodiment.
Figure 7D:
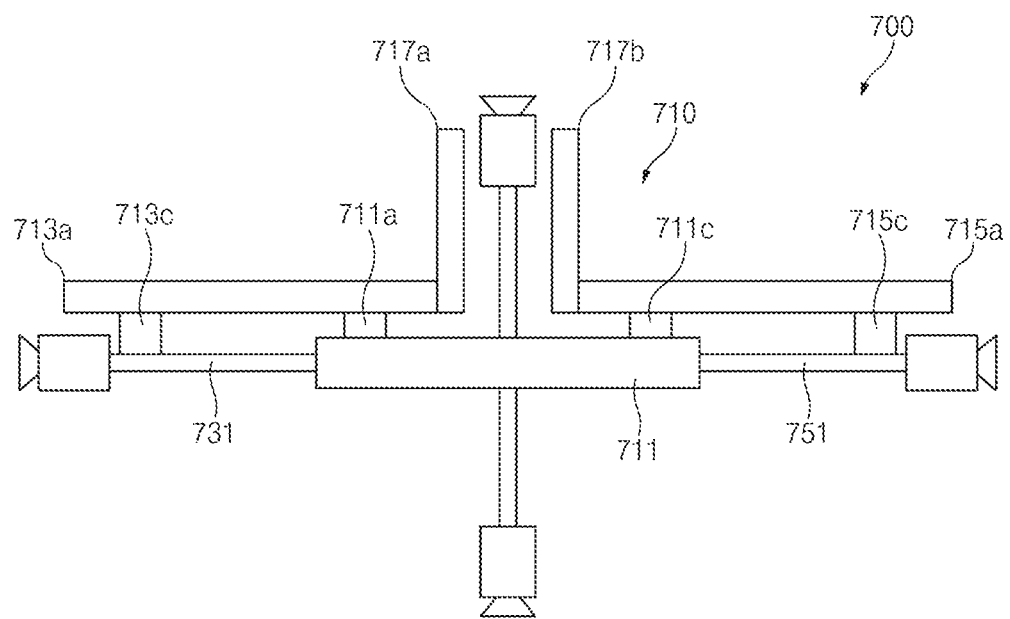
FIG. 7D is a view for describing an internal structure of an unmanned aerial vehicle having a sixth structure, according to an embodiment.
Figure 7E:
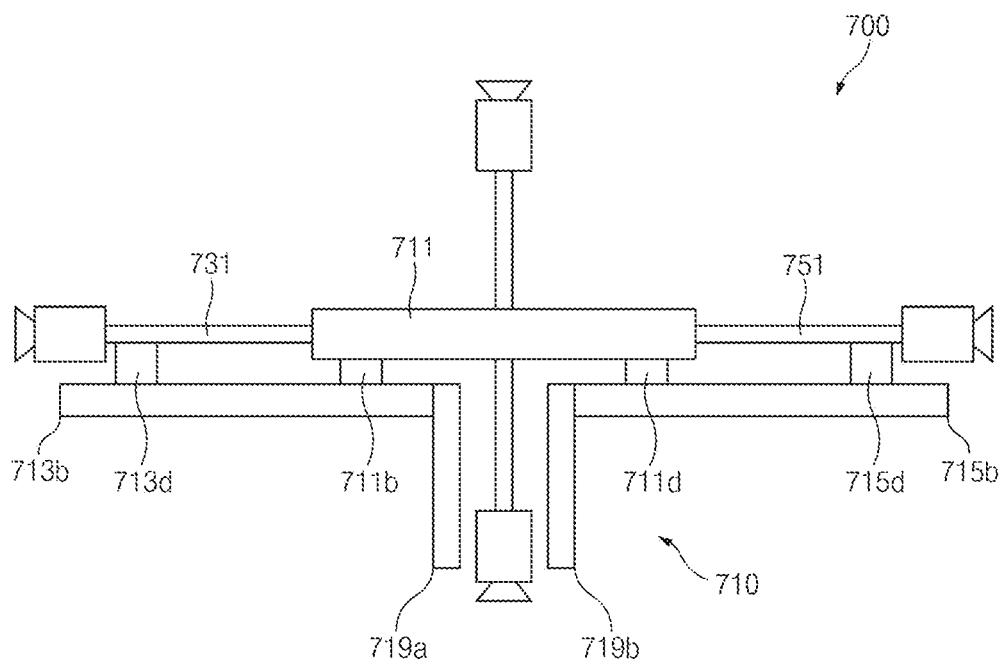
FIG. 7E is a view for describing an internal structure of an unmanned aerial vehicle having a seventh structure, according to an embodiment.

FIG. 7C is a view for describing an internal structure of an unmanned aerial vehicle having a fifth structure, according to an embodiment. FIG. 7D is a view for describing an internal structure of an unmanned aerial vehicle having a sixth structure, according to an embodiment. FIG. 7E is a view for describing an internal structure of an unmanned aerial vehicle having a seventh structure, according to an embodiment.

Referring to FIG. 7C, the unmanned aerial vehicle 700 may have a form in which at least one camera protrudes outside the frame constituting the main body 710. For example, the camera disposed in the side direction of the main body 710 may be disposed to protrude toward the outside of the frame constituting the main body 710. As illustrated in FIG. 7C, the left camera connection part 731 may extend from the left side surface of the circuit mounting part 711 by a specified length so as to protrude between the upper left horizontal frame 713a and the lower left horizontal frame 713b; the right camera connection part 751 may extend from the right side surface of the circuit mounting part 711 by a specified length so as to protrude between the upper right horizontal frame 715a and the lower right horizontal frame 715b.

According to an embodiment, a frame in a horizontal direction among frames constituting the main body 710 may be provided to surround only the circuit mounting part 711. For example, the upper left horizontal frame 713a and the lower left horizontal frame 713b may not surround the left camera connection part 731, and the upper right horizontal frame 715a and the lower right horizontal frame 715b may not surround the right camera connection part 751. In this case, the first damper 713c, the second damper 713d, the third damper 715c, and the fourth damper 715d, which are illustrated in FIG. 7A may be omitted, and the circuit mounting part 711 may be fixed to the upper left horizontal frame 713a, the lower left horizontal frame 713b, the upper right horizontal frame 715a, and the lower right horizontal frame 715b through the ninth damper 711a, the tenth damper 711b, the eleventh damper 711c, and the twelfth damper 711d, respectively.

Referring to FIGS. 7D and 7E, in the unmanned aerial vehicle 700, at least one frame constituting the main body 710 may be omitted. For example, as illustrated in FIG. 7D, in the main body 710, the frames disposed at the lower end may be omitted. For example, in the main body 710, the lower left horizontal frame 713b, the lower right horizontal frame 715b, the lower left vertical frame 719a, and the lower right vertical frame 719b may be omitted. For another example, in the main body 710, the frames disposed at the upper end may be omitted. For example, in the main body 710, the upper left horizontal frame 713*a*, the upper right horizontal frame 715*a*, the upper left vertical frame 717*a*, and the upper right vertical frame 717*b* may be omitted.

Figure 8A:
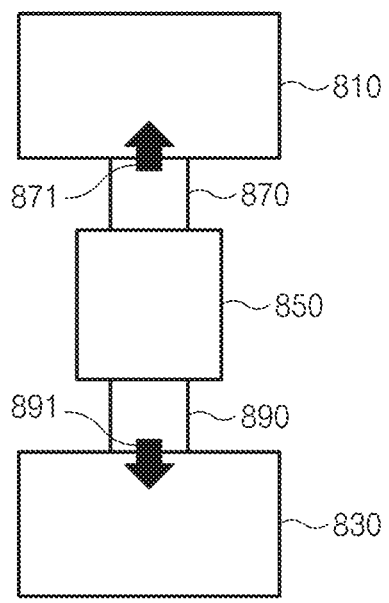
FIG. 8A is a view for describing a support structure of a camera connection part of an unmanned aerial vehicle having a fourth structure and a fifth structure, according to an embodiment.
Figure 8B:
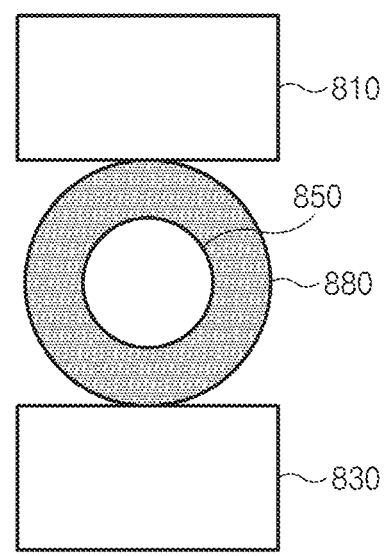
FIG. 8B is a view for describing another support structure of a camera connection part of an unmanned aerial vehicle having a fourth structure and a fifth structure, according to an embodiment.

FIG. 8A is a view for describing a support structure of a camera connection part of an unmanned aerial vehicle having a fourth structure and a fifth structure, according to an embodiment. FIG. 8B is a view for describing another support structure of a camera connection part of an unmanned aerial vehicle having a fourth structure and a fifth structure, according to an embodiment.

Referring to FIGS. 8A and 8B, the shape and connection structure of a damper (e.g., a first damper 870 or a second damper 890) connecting a camera connection part 850 and each frame (e.g., an upper end frame 810 or a lower end frame 830) may be different depending on the shape of the camera connection part 850 and the location at which the camera connection part 850 is connected. For example, as illustrated in FIG. 8A, when the shape of the cross-section of the camera connection part 850 is a rectangle, the first damper 870 and the second damper 890 may be interposed between the upper surface of the camera connection part 850 and the upper end frame 810 and between the lower surface of the camera connection part 850 and the lower end frame 830, respectively. In this case, the first damper 870 may be fixed in the form of being suspended from the upper end frame 810, and the second damper 890 may be fixed in the form of being pressed by the lower end frame 830. For example, the first damper 870 may be fixed to the upper end frame 810 based on an action 871 of tension or the like, and the second damper 890 may be fixed to the lower end frame 830 based on an action 891 of compressive force, gravity, or the like.

For another example, as illustrated in FIG. 8B, when the shape of the cross section of the camera connection part 850 is circular, a third damper 880 having the form of a donut surrounding the outer circumference of the camera connection part 850 may connect the upper end frame 810 to the camera connection part 850 and may connect the lower end frame 830 to the camera connection part 850. However, the shape and connection structure of the damper are not limited thereto. It will be easily understood by those skilled in the art that any shape of damper and connection structure is possible when a damper is interposed between the camera connection part 850 and each frame to fix the camera connection part 850 to each frame and to mitigate the occurring vibration.

As described above, according to various embodiments, an unmanned aerial vehicle may include a main body (e.g., the main body 110), a plurality of propeller connection parts (e.g., the first propeller connection part 131, the second propeller connection part 133, or the third propeller connection part 135) extending from at least one side surface of the main body by a specified length, a plurality of propellers (e.g., the first propeller 151, the second propeller 153, or the third propeller 155) respectively connected to ends of the plurality of propeller connection parts, and a plurality of cameras (e.g., the first camera 171, the second camera 173, the third camera 175, the fourth camera 177, or the fifth camera 179) mounted on at least one surface of the main body. A first camera (e.g., the first camera 171, the second camera 173, or the third camera 175) interposed between the plurality of propeller connection parts among the plurality of cameras may be disposed spaced from a center point of the main body by a distance of a first size. A first virtual straight line connecting a center point of a first propeller disposed adjacent to the first camera among the plurality of propellers to a center point of the main body may have a length of a second size. A second virtual straight line drawn vertically from the first camera to the first straight line may have a length of a third size. The third size may be greater than a radius of the first propeller and the first size may be smaller than the second size.

According to various embodiments, a second camera (e.g., the first camera 171, the second camera 173, or the third camera 175), which is interposed between the plurality of propeller connection parts and which is different from the first camera, from among the plurality of cameras may be disposed such that a first capture area defined by a capture angle of the first camera partially overlaps with a second capture area defined by a capture angle of the second camera.

According to various embodiments, an overlap angle of an area in which the first capture area overlaps with the second capture area may be not less than 10 degrees.

According to various embodiments, a second camera (e.g., the fourth camera 177 or the fifth camera 179) disposed on an upper surface or a lower surface of the main body among the plurality of cameras may be disposed such that a first capture area defined by a capture angle of the first camera partially overlaps with a second capture area defined by a capture angle of the second camera.

According to various embodiments, an overlap angle of an area in which the first capture area overlaps with the second capture area may be not less than 10 degrees.

According to various embodiments, at least one landing member (e.g., the first landing member 191 or the second landing member 193) may be disposed on a lower surface of the main body, and the landing member may be positioned within a non-capture area out of capture angles of the plurality of cameras.

According to various embodiments, the main body may include a center part (e.g., the upper center part 611*a*, the right center part 611*b*, the lower center part 611*c*, or the left center part 611*d*) and a plurality of side parts (e.g., the upper left side part 613*a*, the upper right side part 613*b*, the lower right side part 613*c*, or the lower left side part 613*d*) extending from one part of the center part to the other part of the center part, each of rims of the side parts may be provided in a form of an arc disposed spaced from a center point of the center part by a distance of a specified size, and each of the plurality of side parts may be provided in a form to surround at least one of the plurality of propellers.

According to various embodiments, the side parts may include a first side part and a second side part adjacent to the first side part, and the first camera may be interposed between the first side part and the second side part on at least one side surface of the center part.

According to various embodiments, a second camera disposed on an upper surface or a lower surface of the main body among the plurality of cameras may be disposed on an upper surface or a lower surface of the center part.

According to various embodiments, an unmanned aerial vehicle may include a main body including at least one of an upper end frame and a lower end frame, a circuit mounting part fixed to the at least one of the upper end frame and the lower end frame, a plurality of propeller connection parts extending from at least one side surface of the main body by a specified length, a plurality of propellers respectively connected to ends of the plurality of propeller connection parts, a plurality of camera connection parts extending from at least one surface of the circuit mounting part, and a plurality of cameras respectively connected to ends of the plurality of camera connection parts. A first camera interposed between the plurality of propeller connection parts among the plurality of cameras may be disposed spaced from a center point of the main body by a distance of a first size. A first virtual straight line connecting a center point of a first propeller disposed adjacent to the first camera among the plurality of propellers to a center point of the main body may have a length of a second size. A second virtual straight line drawn vertically from the first camera to the first straight line may have a length of a third size. The third size may be greater than a radius of the first propeller and the first size may be smaller than the second size.

According to various embodiments, at least one of the circuit mounting part and the plurality of camera connection parts may be fixed to the upper end frame or the lower end frame through a shock absorbing member.

According to various embodiments, at least one of the plurality of camera connection parts may be disposed substantially in parallel with the upper end frame or the lower end frame, and may extend to protrude toward an outside of the upper end frame or the lower end frame.

Figure 9:
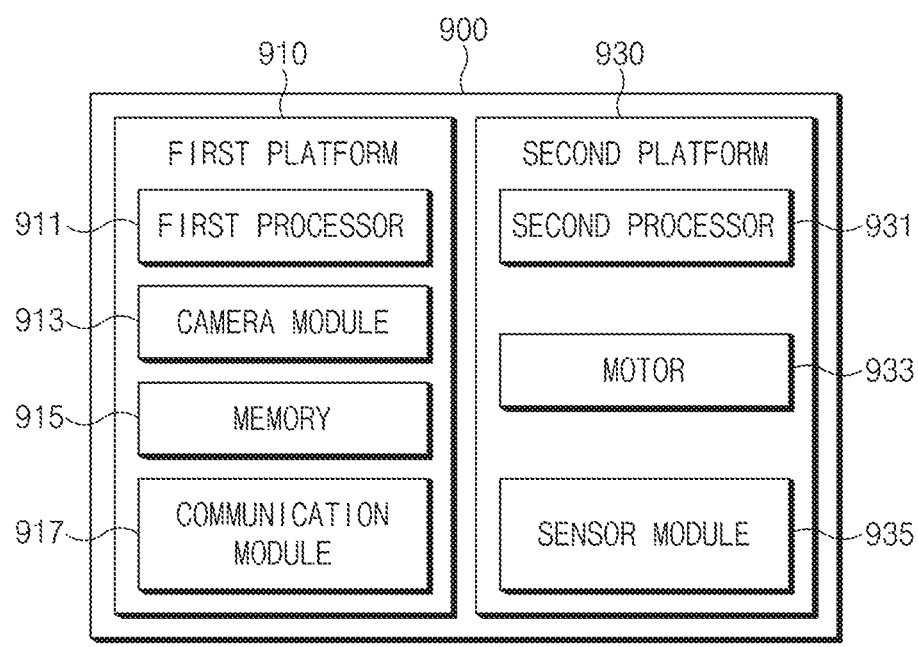
FIG. 9 is a block diagram of an unmanned aerial vehicle, according to an embodiment.

FIG. 9 is a block diagram of an unmanned aerial vehicle, according to an embodiment.

Referring to FIG. 9, an unmanned aerial vehicle 900 may include a first platform 910 and a second platform 930. According to an embodiment, the first platform 910 may be a platform for camera control and image processing, and the second platform 930 may be a platform for flight control. For example, the first platform 910 may be an OS-based platform, and the second platform 930 may be a Non-OS-based platform.

The first platform 910 may include a first processor 911, a camera module 913, a memory 915, and a communication module 917. The first processor 911 may include a mobile application processor (mobile AP), and may perform data processing or an operation associated with control or communication of at least one other component(s) included in the first platform 910.

According to an embodiment, the first processor 911 may correct an image captured through the camera module 913 and may store the corrected image in the memory 915. Moreover, the first processor 911 may transmit a control signal, which is received through the communication module 917 and is associated with flight, to a second processor 931.

The camera module 913 (or a camera) may capture a still image and a video. According to an embodiment, the camera module 913 may include an imaging device. According to an embodiment, for example, the imaging device may include at least one of a lens that receives image light of a subject and converts the light into an image, an aperture that adjusts the amount of light passing through the lens, a shutter that closes or opens the aperture such that an image sensor is exposed to the light passing through the lens during a specific time, the image sensor that receives the image from the lens as a light signal, and an internal memory. The internal memory may temporarily store the captured image. According to an embodiment, the internal memory may store an image photographed through the image sensor, before the butter is manipulated.

The memory 915 may store a command or data associated with at least one other element of the unmanned aerial vehicle 900. According to an embodiment, the memory 915 may store an image photographed through the camera module 913. For another example, the memory 915 may store motion information (e.g., sensing data) of the unmanned aerial vehicle 900 obtained through a sensor module 935.

The communication module 917 may establish communication between the unmanned aerial vehicle 900 and an external device. For example, the communication module 917 may be connected to a network through a wireless communication or a wired communication, thus communicating with the external electronic device. The external electronic device may include a device (e.g., a mobile electronic device or head-mounted device (HMD)) paired with the unmanned aerial vehicle 900.

The second platform 930 may include the second processor 931, a motor 933, and the sensor module 935. The second processor 931 may perform data processing or an operation associated with control and/or communication of at least one other component included in the second platform 930. According to an embodiment, the second processor 931 may control the operation of the motor 933 by receiving a control signal associated with the flight from the first processor 911.

The motor 933 may rotate the propeller of the unmanned aerial vehicle 900. For example, the motor 933 may rotate the rotation axis of the motor 933 when power is applied. The propeller of the unmanned aerial vehicle 900 may be rotated due to rotation of the rotation axis.

The sensor module 935 may measure a physical quantity or may detect an operation state of the unmanned aerial vehicle 100; the sensor module 935 may convert the measured or detected information to an electrical signal. The sensor module 935 may include a gyro sensor, an acceleration sensor, a barometric pressure sensor, or the like. The sensor module 935 may further include a control circuit for controlling at least one or more sensors included therein.

According to an embodiment, the sensor module 935 may collect sensing data according to the movement of the unmanned aerial vehicle 900. For example, the unmanned aerial vehicle 900 may collect sensing data according to the elevation, rotation, or the like of the unmanned aerial vehicle 900.

Figure 10:
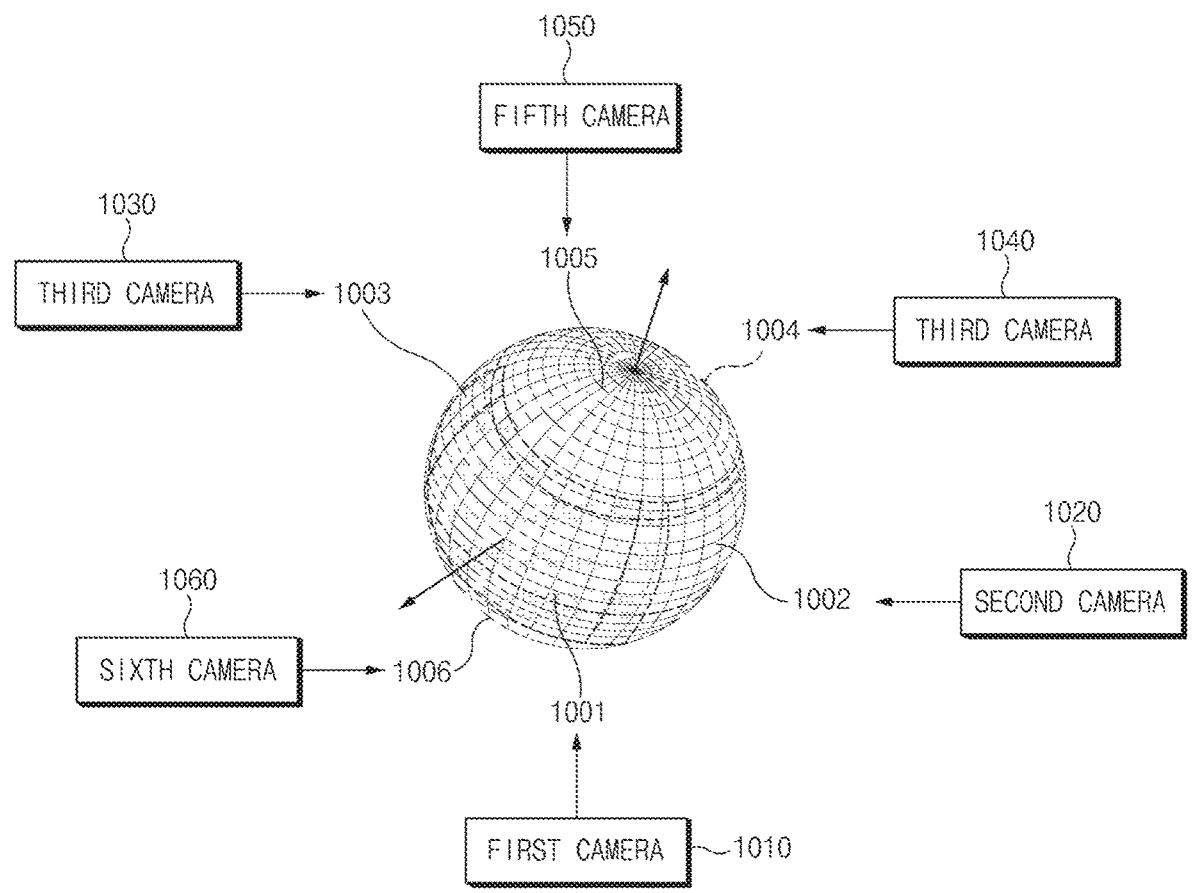
FIG. 10 is a view for describing an omnidirectional image captured using a plurality of cameras, according to an embodiment.

FIG. 10 is a view for describing an omnidirectional image captured using a plurality of cameras, according to an embodiment.

Referring to FIG. 10, an unmanned aerial vehicle (e.g., the unmanned aerial vehicle 100) may capture an omnidirectional image, using a plurality of cameras mounted on the unmanned aerial vehicle. As illustrated in FIG. 10, the unmanned aerial vehicle may obtain a front view image 1001 by using a first camera 1010 (e.g., the third camera 575) disposed on the lower side surface of the unmanned aerial vehicle, may obtain a right view image 1002 by using a second camera 1020 (e.g., the second camera 573) disposed on the right side surface of the unmanned aerial vehicle, may obtain a left view image 1003 by using a third camera 1030 (e.g., the fourth camera 577) disposed on the left side surface of the unmanned aerial vehicle, may obtain a rear view image 1004 by using a fourth camera 1040 (e.g., the first camera 571) disposed on the upper side surface of the unmanned aerial vehicle, may obtain an upper view image 1005 by using a fifth camera 1050 (e.g., the fifth camera 578) disposed on the upper surface of the unmanned aerial vehicle, and may obtain a lower view image 1006 by using a sixth camera 1060 (e.g., the sixth camera 579) disposed on the lower surface of the unmanned aerial vehicle. However, the location of a camera and the number of cameras are not limited to thereto. At least one of the cameras described above may be omitted, and at least another camera may be further disposed.

According to an embodiment, some areas of the images captured by the cameras described above may overlap with each other. For example, a partial area of the front view image 1001 obtained by the first camera 1010 may overlap with at least one of the right view image 1002 obtained by the second camera 1020 disposed adjacent to the first camera 1010, the left view image 1003 obtained by the third camera 1030, the upper view image 1005 obtained by the fifth camera 1050, and the lower view image 1006 obtained by the sixth camera 1060. According to an embodiment, the area in which the images overlap with each other may be an area corresponding to the capture angle of adjacent cameras having 10 degrees or more.

Figure 11:
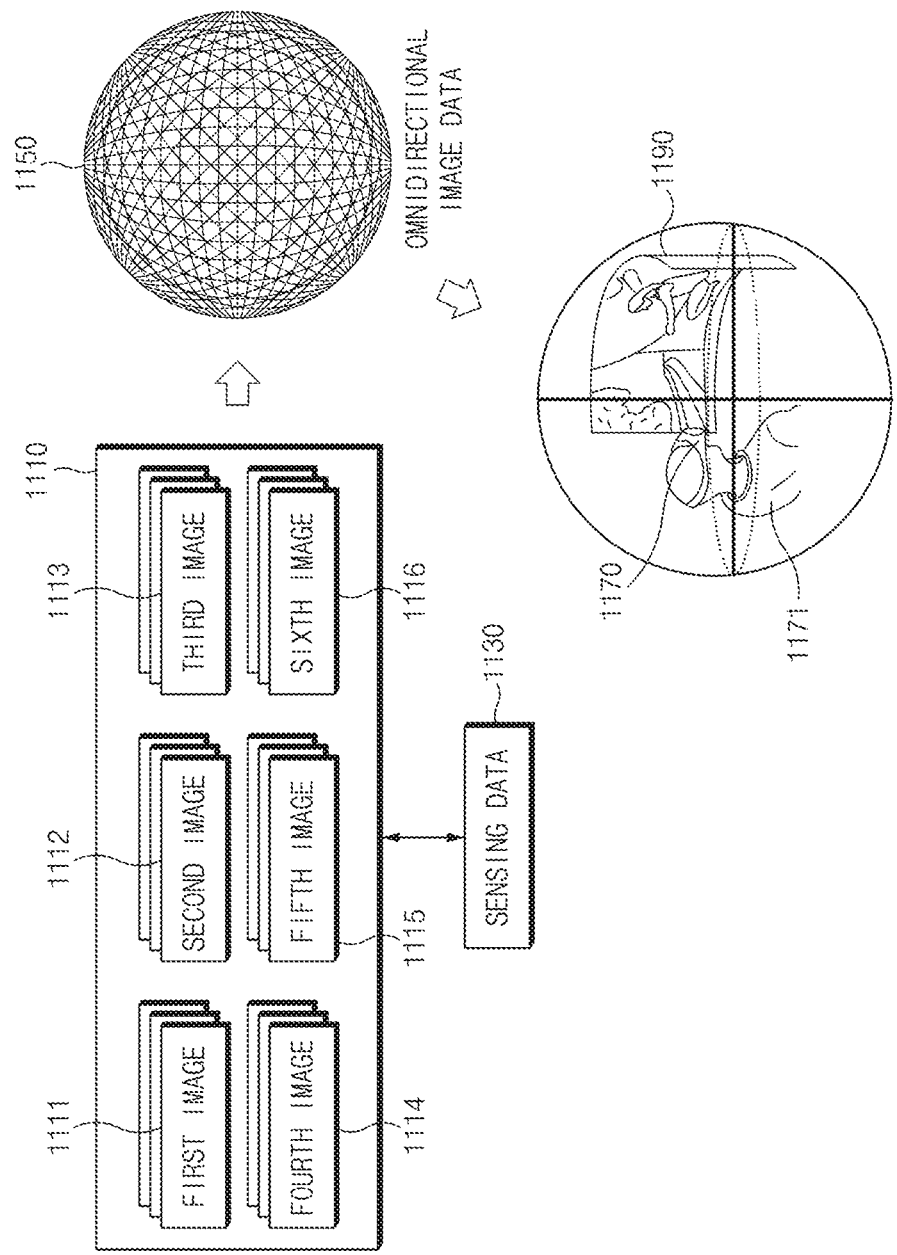
FIG. 11 is a view for describing a method of transmitting an omnidirectional image captured using a plurality of cameras to an external electronic device, according to an embodiment.

FIG. 11 is a view for describing a method of transmitting an omnidirectional image captured using a plurality of cameras to an external electronic device, according to an embodiment.

Referring to FIG. 11, an unmanned aerial vehicle (e.g., the unmanned aerial vehicle 100) may capture an omnidirectional image, using a plurality of cameras mounted on the unmanned aerial vehicle. For example, the unmanned aerial vehicle may obtain a first image 1111, a second image 1112, a third image 1113, a fourth image 1114, a fifth image 1115, and a sixth image 1116 through a first camera (e.g., the first camera 1010), a second camera (e.g., the second camera 1020), a third camera (e.g., the third camera 1030), a fourth camera (e.g., the fourth camera 1040), a fifth camera (e.g., the fifth camera 1050), and a sixth camera (e.g., the sixth camera 1060) mounted on the unmanned aerial vehicle, respectively.

According to an embodiment, the unmanned aerial vehicle may correct the obtained images 1110 based on sensing data 1130. For example, the unmanned aerial vehicle may correct the obtained images 1110 based on the sensing data 1130 according to the movement of the unmanned aerial vehicle. In addition, the unmanned aerial vehicle may obtain an omnidirectional image 1150 by stitching the corrected images.

According to an embodiment, the unmanned aerial vehicle may transmit the omnidirectional image 1150 to an external electronic device, for example, a head-mounted device 1170 that can be worn by a user 1171. In this case, the head-mounted device 1170 may provide the user 1171 with the effect of actually controlling the unmanned aerial vehicle by outputting the omnidirectional image 1150 as a virtual reality (VR) image or outputting an augmented reality (AR) image 1190 generated using the omnidirectional image 1150. In some embodiments, the unmanned aerial vehicle may transmit the omnidirectional image 1150 to a mobile electronic device removable from the head-mounted device 1170.

Figure 12:
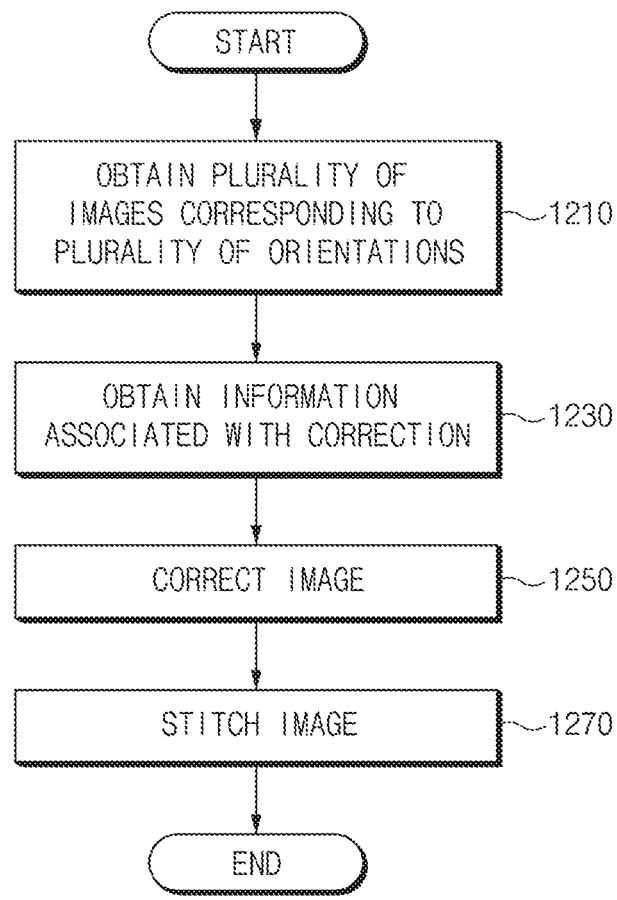
FIG. 12 is a view for describing a method of correcting a captured image, according to an embodiment.

FIG. 12 is a view for describing a method of correcting a captured image, according to an embodiment.

Referring to FIG. 12, in operation 1210, an unmanned aerial vehicle (e.g., the unmanned aerial vehicle 100) may obtain a plurality of images corresponding to a plurality of orientations. According to an embodiment, the unmanned aerial vehicle may obtain the plurality of images corresponding to the plurality of orientations, using a plurality of cameras mounted on the unmanned aerial vehicle. For example, the unmanned aerial vehicle may obtain a front view image (e.g., the front view image 1001) by using a first camera (e.g., the third camera 575) disposed on the lower side surface of the unmanned aerial vehicle, may obtain a right view image (e.g., the right view image 1002) by using a second camera (e.g., the second camera 573) disposed on the right side surface of the unmanned aerial vehicle, may obtain a left view image (e.g., the left view image 1003) by using a third camera (e.g., the fourth camera 577) disposed on the left side surface of the unmanned aerial vehicle, may obtain a rear view image (e.g., the rear view image 1004) by using a fourth camera (e.g., the first camera 571) disposed on the upper side surface of the unmanned aerial vehicle, may obtain a upper view image (e.g., the upper view image 1005) by using a fifth camera (e.g., the fifth camera 578) disposed on the upper surface of the unmanned aerial vehicle, and may obtain a lower view image (e.g., the lower view image 1006) by using a sixth camera (e.g., the sixth camera 579) disposed on the lower surface of the unmanned aerial vehicle.

In operation 1230, the unmanned aerial vehicle may obtain information associated with correction. According to an embodiment, the unmanned aerial vehicle may obtain a reference image among images obtained through cameras. For example, the unmanned aerial vehicle may assign an image corresponding to the specified movement information of the unmanned aerial vehicle as the reference image. For example, the reference image may include an image captured in a state where an unmanned aerial vehicle is maintained in a horizontal state. For example, the reference image may include an image captured in a state where the unmanned aerial vehicle is in a hovering state. According to another embodiment, the unmanned aerial vehicle may obtain movement information of the unmanned aerial vehicle. For example, the unmanned aerial vehicle may obtain sensing data according to the movement of the unmanned aerial vehicle. The sensing data may include sensing data obtained through the sensor module included in the unmanned aerial vehicle.

In operation 1250, the unmanned aerial vehicle may correct the obtained image. According to an embodiment, the unmanned aerial vehicle may correct the obtained image based on the reference image. According to another embodiment, the unmanned aerial vehicle may correct the obtained image based on the movement information of the unmanned aerial vehicle.

In operation 1270, the unmanned aerial vehicle may stitch the corrected image. For example, the unmanned aerial vehicle may obtain an omnidirectional image by stitching images corresponding to each orientation. According to an embodiment, the unmanned aerial vehicle may stitch images by using an overlapped area of each of images. For example, the unmanned aerial vehicle may stitch a front view image and a right view image by using an overlapped area of the front view image and the right view image, may stitch the front view image and a left view image by using an overlapped area of the front view image and the left view image, may stitch the front view image and an upper side image by using an overlapped area of the front view image and the upper side image, and may stitch the front view image and a lower view image by using an overlapped area of the front view image and the lower view image. Moreover, the unmanned aerial vehicle may stitch the right view image or the left view image and the rear view image, using an overlapped area of the right view image or the left view image and the rear view image.

According to various embodiments, the unmanned aerial vehicle may perform operation 1270 before operation 1250 is performed. For example, the unmanned aerial vehicle may stitch the images corresponding to each orientation firstly and then may correct the stitched omnidirectional image.

In some embodiments, the unmanned aerial vehicle may skip at least one of operation 1250 and operation 1270. For example, the unmanned aerial vehicle may transmit uncorrected images or unstitched images to an external electronic device (e.g., a head-mounted device) as it is. In this case, the external electronics may correct or stitch the images and output the corrected or stitched images to a display.

As described above, according to various embodiments, an image processing method of an unmanned aerial vehicle may include obtaining a plurality of images corresponding to a plurality of orientations, obtaining information associated with correction of the plurality of images, correcting the plurality of images based on the information associated with the correction, and stitching the corrected plurality of images.

According to various embodiments, the obtaining of the information associated with the correction may include assigning an image, which is captured in a state where the unmanned aerial vehicle is not inclined, from among the plurality of images to a reference image.

According to various embodiments, the correcting of the plurality of images may include extracting a feature of the reference image and correcting the plurality of images based on the feature of the reference image.

According to various embodiments, the extracting of the feature of the reference image may include extracting at least one of a horizontal line, a building, and a coastline included in the reference image as the feature.

According to various embodiments, the obtaining of the information associated with the correction may include obtaining sensing data according to movement of the unmanned aerial vehicle.

According to various embodiments, the correcting of the plurality of images may include correcting the plurality of images based on the sensing data.

According to various embodiments, the stitching of the corrected plurality of images may include stitching the corrected plurality of images by using an overlapped area of the corrected plurality of images.

According to various embodiments, the image processing method may further include transmitting the stitched image to an external electronic device.

Figure 13:
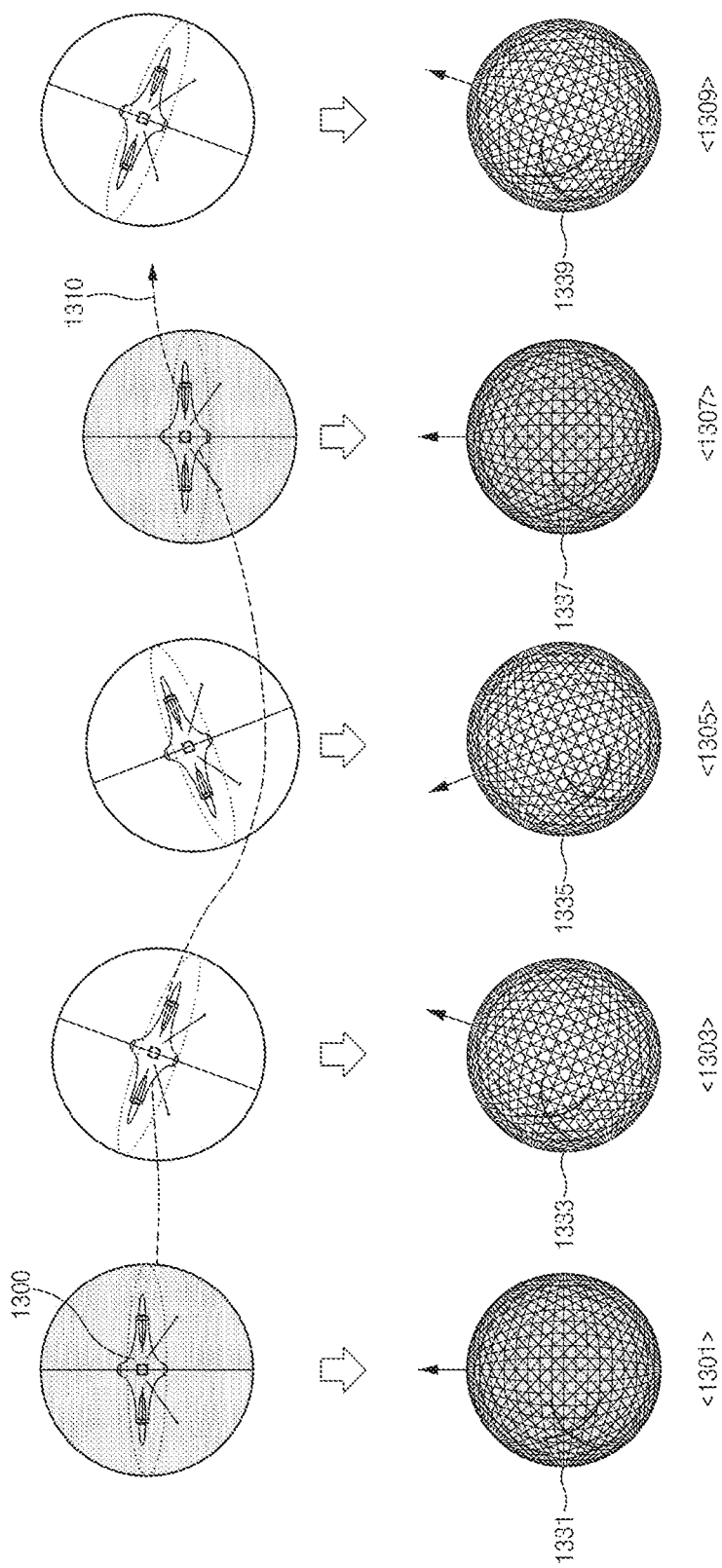
FIG. 13 is a view for describing shaking of an image captured depending on movement of an unmanned aerial vehicle, according to an embodiment.

FIG. 13 is a view for describing shaking of an image captured depending on movement of an unmanned aerial vehicle, according to an embodiment.

Referring to FIG. 13, the movement may occur due to a flight operation of an unmanned aerial vehicle 1300. For example, the main body of the unmanned aerial vehicle 1300 may be inclined such that the unmanned aerial vehicle 1300 flies to the front, the rear, the left, and the right. As such, the image captured through a camera mounted on the unmanned aerial vehicle 1300 may be shaken.

For example, as illustrated in a first state 1301, the central axis of a first image 1331 captured in a state where the unmanned aerial vehicle 1300 is in a hovering state (e.g., a state where the slope is 0 degree) may be in parallel with the vertical direction of the unmanned aerial vehicle 1300. However, as illustrated in a second state 1303, a second image 1333 captured in a state where the unmanned aerial vehicle 1300 is inclined to the right by a first slope (e.g., 15 degrees) to move to the right may be an image, the center axis of which is inclined to the right by the first slope. As such, when the first image 1331 and the second image 1333 are output sequentially, the images may be seen as if the images are shaken because the central axes of the images do not match.

As such, the unmanned aerial vehicle 1300 may correct the images, the central axis of each of which is inclined, to match the central axis, thereby preventing the image from being shaken. For example, as illustrated in the second state 1303 or a fifth state 1309, the angle of the second image 1333 or a fifth image 1339 captured in a state where the unmanned aerial vehicle 1300 is inclined to the right to move to the right may be corrected to the left; as illustrated in a third state 1305, the angle of a third image 1335 captured in a state where the unmanned aerial vehicle 1300 is inclined to the left to move to the left may be corrected to the right. According to an embodiment, the unmanned aerial vehicle 1300 may assign the first image 1331 or a fourth image 1337, which is captured in a hovering state while the unmanned aerial vehicle 1300 is not inclined (e.g., the first state 1301 or a fourth state 1307), to a reference image and may correct the second image 1333, the third image 1335, and the fifth image 1339, using the reference image.

Figure 14:
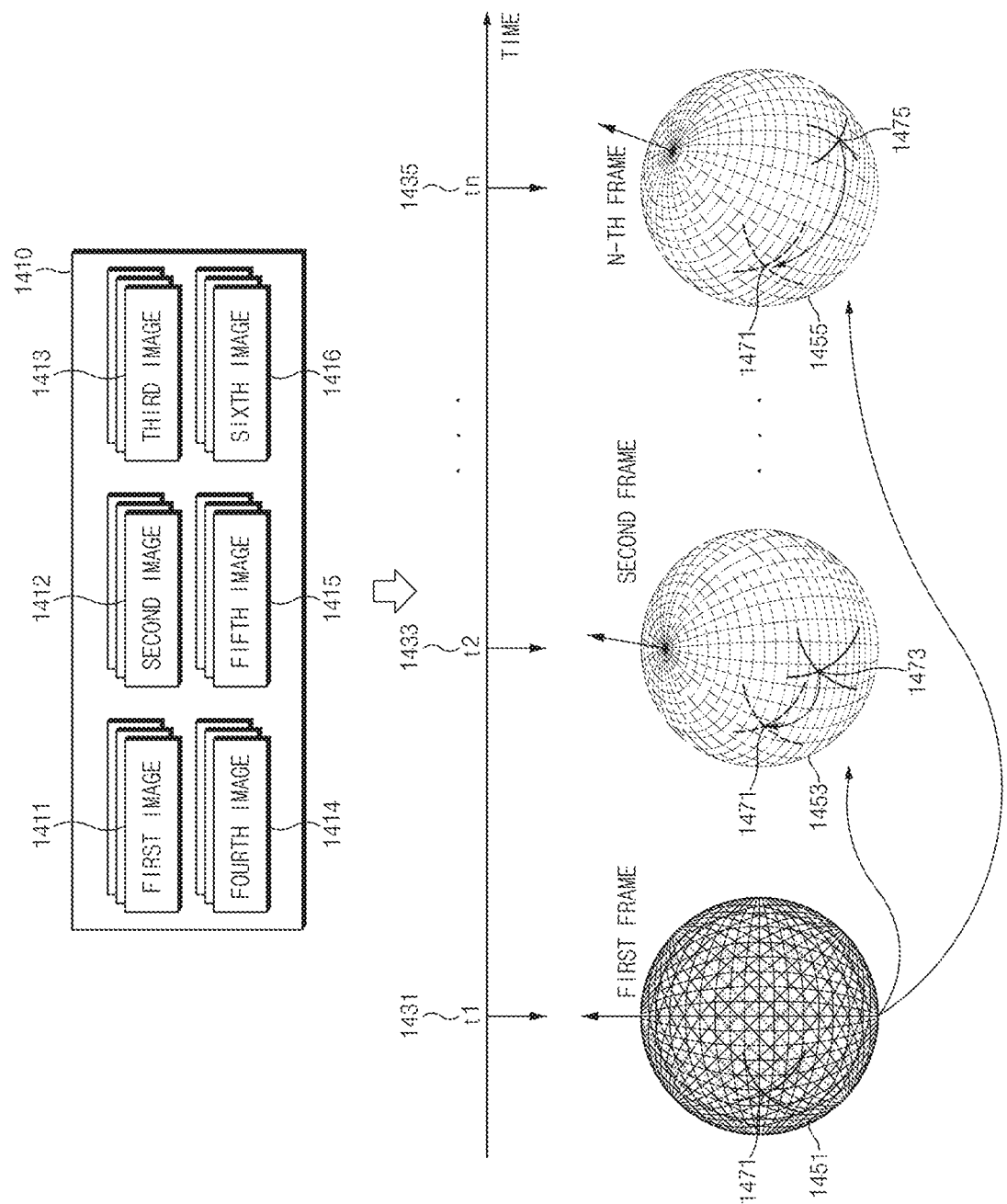
FIG. 14 is a view for describing a method of correcting an image captured based on a reference image, according to an embodiment.

FIG. 14 is a view for describing a method of correcting an image captured based on a reference image, according to an embodiment.

Referring to FIG. 14, an unmanned aerial vehicle (e.g., the unmanned aerial vehicle 100) may correct images 1410 (e.g., a first image 1411, a second image 1412, a third image 1413, a fourth image 1414, a fifth image 1415, and a sixth image 1416) captured through a plurality of cameras. According to an embodiment, the unmanned aerial vehicle may assign a reference image among the captured images 1410 and may correct the captured images 1410, using the reference image.

According to an embodiment, the unmanned aerial vehicle may assign an image, which is captured in a state where the unmanned aerial vehicle is not inclined, from among the captured images 1410, to the reference image. As illustrated in FIG. 14, the unmanned aerial vehicle may assign an image captured at the first time t1 1431 that is a state where the unmanned aerial vehicle is not inclined, to the reference image. According to an embodiment, an image captured at the first time 1431 may be an image 1451 corresponding to the first frame of the captured images 1410. For example, the image captured at the first time 1431 may be the image 1451 from stitching images corresponding to the first frame of the first image 1411, the first frame of the second image 1412, the first frame of the third image 1413, the first frame of the fourth image 1414, the first frame of the fifth image 1415, and the first frame of the sixth image 1416.

According to another embodiment, the unmanned aerial vehicle may assign the reference image for each image of the captured images 1410. For example, the unmanned aerial vehicle may assign the reference image of each of the first image 1411, the second image 1412, the third image 1413, the fourth image 1414, the fifth image 1415, and the sixth image 1416. For example, the unmanned aerial vehicle may assign the reference images of the first image 1411, the second image 1412, the third image 1413, the fourth image 1414, the fifth image 1415, and the sixth image 1416 as images corresponding to the first frame of the first image 1411, the first frame of the second image 1412, the first frame of the third image 1413, the first frame of the fourth image 1414, the first frame of the fifth image 1415, and the first frame of the sixth image 1416, respectively.

According to an embodiment, when the reference image 1451 is assigned, the unmanned aerial vehicle may correct images of other frame(s) other than a frame corresponding to the reference image 1451, using the reference image 1451. For example, the unmanned aerial vehicle may extract a feature 1471 from the reference image 1451 and may correct the feature extracted from images of the other frame(s) so as to correspond to the feature 1471. As illustrated in FIG. 14, the unmanned aerial vehicle may correct (e.g., move a location or change an angle) the images captured at the second time t2 1433 such that the feature 1473 extracted from an image 1453 from stitching images corresponding to the images captured at the second time t2 1433 (e.g., the second frame of the first image 1411, the second frame of the second image 1412, the second frame of the third image 1413, the second frame of the fourth image 1414, the second frame of the fifth image 1415, and the second frame of the sixth image 1416) corresponds to the feature 1471 extracted from the reference image 1451.

In this way, the unmanned aerial vehicle may correct at least one image other than reference image 1451. For example, the unmanned aerial vehicle may correct (e.g., move a location or change an angle) the images captured at the n-th time 'tn' 1435 such that a feature 1475 extracted from an image 1455 from stitching images corresponding to the images captured at the n-th time 'tn' 1435 (e.g., the n-th frame of the first image 1411, the n-th frame of the second image 1412, the n-th frame of the third image 1413, the n-th frame of the fourth image 1414, the n-th frame of the fifth image 1415, and the n-th frame of the sixth image 1416) corresponds to the feature 1471 extracted from the reference image 1451.

Figure 15A:
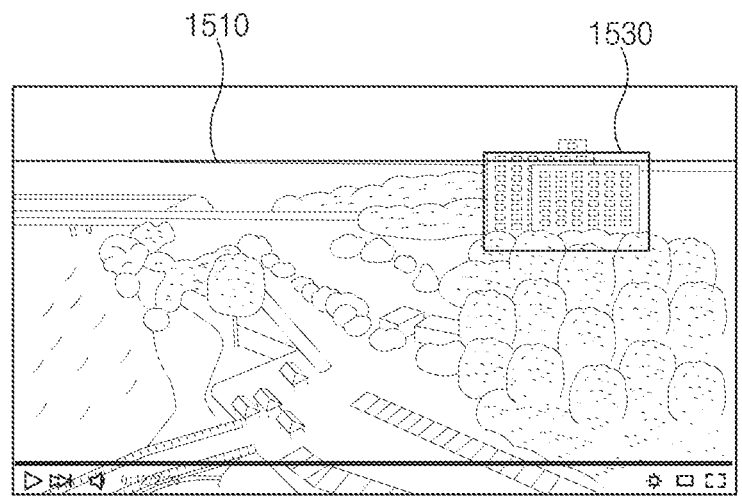
FIG. 15A is a view for describing a method of extracting a feature from a reference image, according to an embodiment.
Figure 15B:
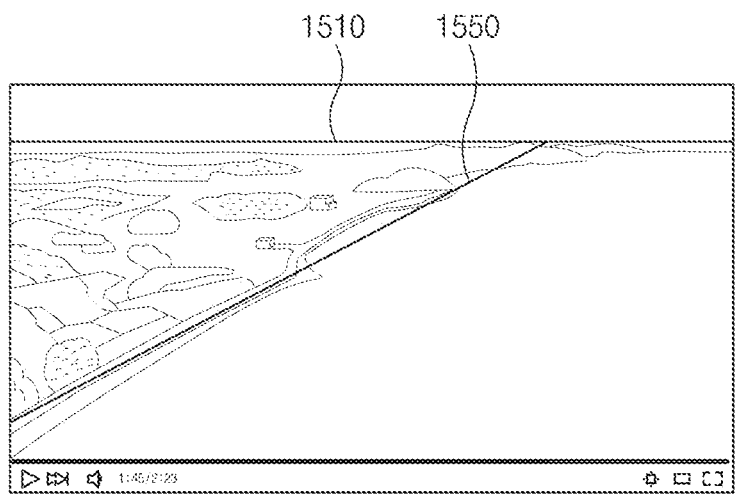
FIG. 15B is a view for describing another method of extracting a feature from a reference image, according to an embodiment.

FIG. 15A is a view for describing a method of extracting a feature from a reference image, according to an embodiment. FIG. 15B is a view for describing another method of extracting a feature from a reference image, according to an embodiment.

Referring to FIGS. 15A and 15B, an unmanned aerial vehicle (e.g., the unmanned aerial vehicle 100) may extract a feature from the captured image. For example, the unmanned aerial vehicle may extract a horizontal line 1510, a building 1530, a coastline 1550, or the like from the captured image to assign the extracted result to the feature. According to various embodiments, the unmanned aerial vehicle may extract fixed subjects such as a mountain, a ground shape, sun, a cloud, the surface of sea, a bridge, and a tree to assign the extracted result to the feature.

Figure 16:
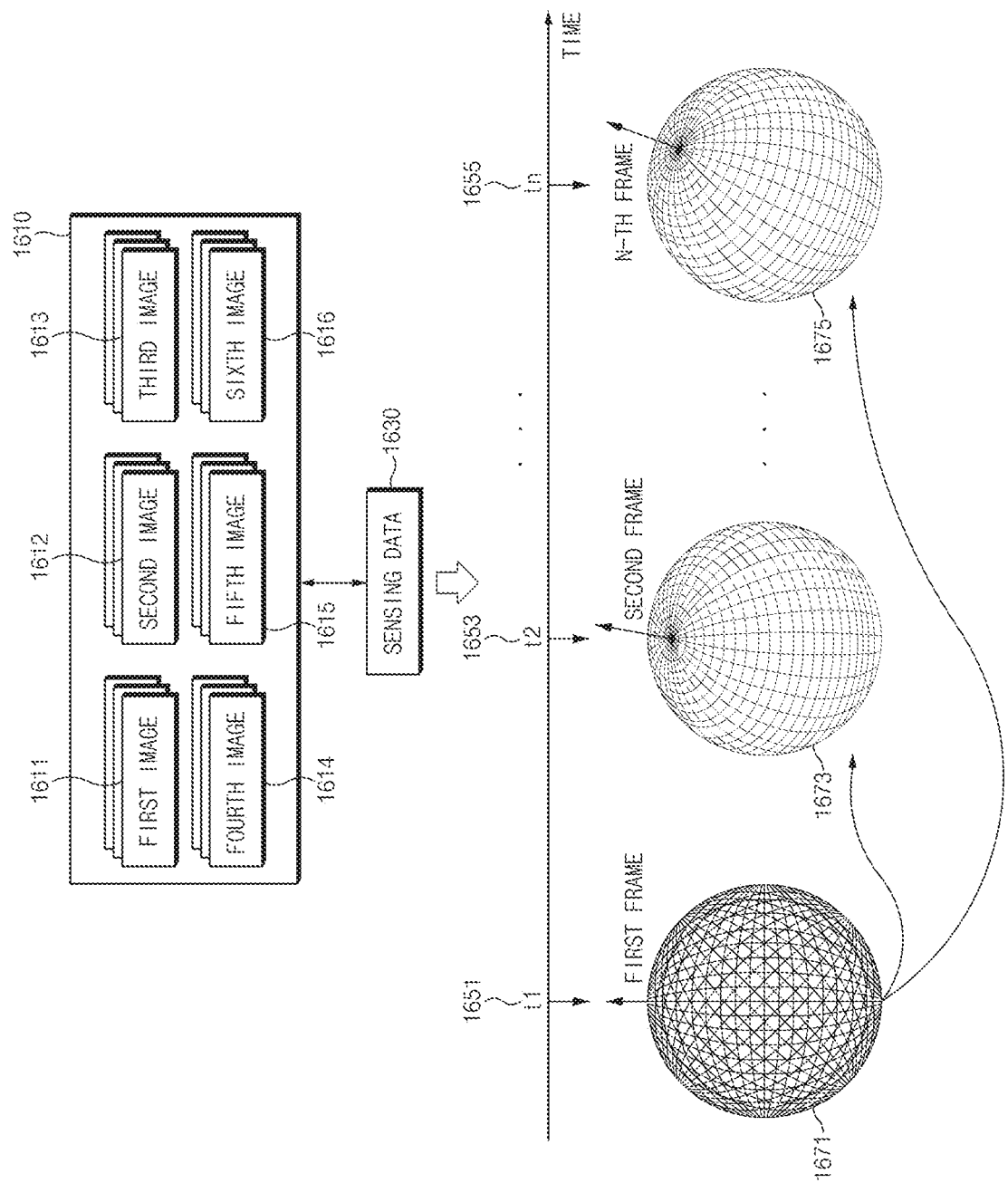
FIG. 16 a view for describing a method of correcting an image captured based on movement information of an unmanned aerial vehicle, according to an embodiment.

FIG. 16 a view for describing a method of correcting an image captured based on movement information of an unmanned aerial vehicle, according to an embodiment.

Referring to FIG. 16, an unmanned aerial vehicle (e.g., the unmanned aerial vehicle 100) may correct images 1610 (e.g., a first image 1611, a second image 1612, a third image 1613, a fourth image 1614, a fifth image 1615, and a sixth image 1616) captured through a plurality of cameras. According to an embodiment, the unmanned aerial vehicle may correct captured images 1610 based on the movement information of the unmanned aerial vehicle. For example, the unmanned aerial vehicle may correct the captured images 1610 based on sensing data 1630 according to the movement of the unmanned aerial vehicle.

According to an embodiment, the unmanned aerial vehicle may assign the sensing data 1630 obtained in a state where the unmanned aerial vehicle is not inclined, to reference data and may correct the captured images 1610, using the difference value between the sensing data 1630 obtained in a state where the unmanned aerial vehicle is inclined, and the reference data. As illustrated in FIG. 16, the unmanned aerial vehicle may assign the sensing data 1630 obtained at the first time t1 1651 being a state where the unmanned aerial vehicle is not inclined, to the reference data. In this case, an image 1671 from stitching images corresponding to the image captured at the first time 1651 (e.g., the first frame of the first image 1611, the first frame of the second image 1612, the first frame of the third image 1613, the first frame of the fourth image 1614, the first frame of the fifth image 1615, and the first frame of the sixth image 1616) may not be corrected. In some embodiments, an image captured at the first time 1651 may be an image without stitching each of the images. For example, the images captured at the first time 1651 may be images corresponding to the first frame of the first image 1611, the first frame of the second image 1612, the first frame of the third image 1613, the first frame of the fourth image 1614, the first frame of the fifth image 1615, and the first frame of the sixth image 1616.

According to an embodiment, when the reference data is assigned, the unmanned aerial vehicle may correct an image 1673 from stitching images corresponding to the images (e.g., the second frame of the first image 1611, the second frame of the second image 1612, the second frame of the third image 1613, the second frame of the fourth image 1614, the second frame of the fifth image 1615, and the second frame of the sixth image 1616, which are captured at the second time t2 1653) captured in a state where the unmanned aerial vehicle is inclined, based on the reference data. In this case, the unmanned aerial vehicle may correct (e.g., move a location or change an angle) the image 1673 by using a difference value between sensing data 1630 according to movement of the unmanned aerial vehicle obtained at the second time 1653 and the reference data.

In this way, the unmanned aerial vehicle may also correct an image 1675 from stitching images corresponding to the images captured at the n-th time 'tn' 1655 (e.g., the n-th frame of the first image 1611, the n-th frame of the second image 1612, the n-th frame of the third image 1613, the n-th frame of the fourth image 1614, the n-th frame of the fifth image 1615, and the n-th frame of the sixth image 1616). For example, the unmanned aerial vehicle may correct (e.g., move a location or change an angle) the image 1675 by using a difference value between sensing data 1630 according to movement of the unmanned aerial vehicle obtained at the n-th time 1655 and the reference data.

Figure 17:
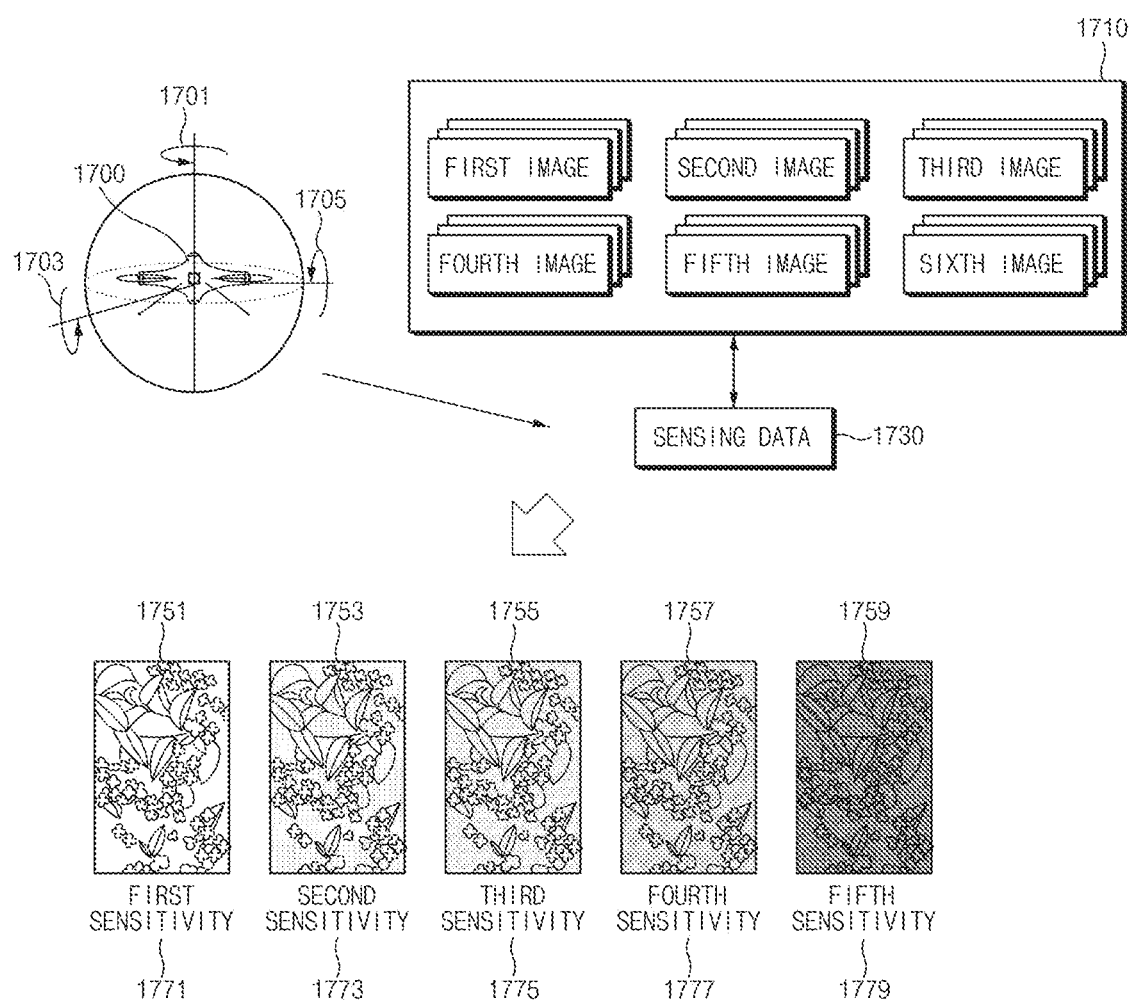
FIG. 17 is a view for describing a method of adjusting ISO sensitivity of a camera depending on movement of an unmanned aerial vehicle, according to an embodiment.

FIG. 17 is a view for describing a method of adjusting ISO sensitivity of a camera depending on movement of an unmanned aerial vehicle, according to an embodiment.

Referring to FIG. 17, an unmanned aerial vehicle 1700 may yaw left or right (or rotation based on z-axis) 1701, may roll left or right (or rotation based on y-axis) 1703, or may pitch up or down (or rotation based on x-axis) 1705. As such, the unmanned aerial vehicle 1700 may obtain sensing data 1730 according to each movement, based on a sensor module included in the unmanned aerial vehicle 1700.

According to an embodiment, the unmanned aerial vehicle 1700 may adjust the ISO sensitivity of the at least one camera mounted on the unmanned aerial vehicle 1700, depending on the movement of the unmanned aerial vehicle 1700. When the movement of the unmanned aerial vehicle 1700 changes rapidly, the blur phenomenon may occur in a captured image 1710. To prevent this, the unmanned aerial vehicle 1700 may determine the movement of the unmanned aerial vehicle 1700 based on the sensing data 1730 according to the movement of the unmanned aerial vehicle 1700; when the degree of the movement of the unmanned aerial vehicle 1700 is not less than a specified size, the unmanned aerial vehicle 1700 may adjust the ISO sensitivity of the at least one camera mounted on the unmanned aerial vehicle 1700.

According to an embodiment, when the movement of the unmanned aerial vehicle 1700 changes rapidly, the unmanned aerial vehicle 1700 may lower the ISO sensitivity. For example, the unmanned aerial vehicle 1700 may sequentially change the sensitivity of the camera from a first sensitivity 1771 to a second sensitivity 1773, a third sensitivity 1775, a fourth sensitivity 1777, and a fifth sensitivity 1779, depending on the movement of the unmanned aerial vehicle 1700. As such, the unmanned aerial vehicle 1700 may sequentially obtain a second image 1753 captured at the second sensitivity 1773 of the camera, a third image 1755 captured at the third sensitivity 1775 of the camera, a fourth image 1757 captured at the fourth sensitivity 1777 of the camera, and a fifth image 1759 captured at the fifth sensitivity 1779 of the camera, from a first image 1751 captured at the first sensitivity 1771 of the camera.

Figure 18:
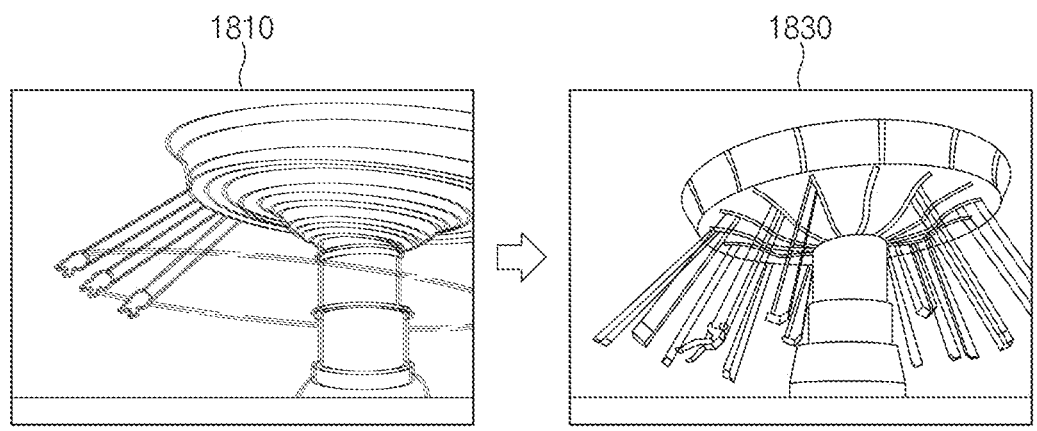
FIG. 18 is a view for describing an image captured according to adjustment of ISO sensitivity of a camera, according to an embodiment.

FIG. 18 is a view for describing an image captured according to adjustment of ISO sensitivity of a camera, according to an embodiment.

Referring to FIG. 18, an unmanned aerial vehicle (e.g., unmanned aerial vehicle 1700) may adjust the ISO sensitivity of at least one camera mounted on the unmanned aerial vehicle, based on movement information of the unmanned aerial vehicle. For example, when the degree of the movement of the unmanned aerial vehicle movement is greater than a specified size, the unmanned aerial vehicle may lower the ISO sensitivity of the camera.

The left view of FIG. 18 illustrates that the blur phenomenon occurs in an image 1810 captured in a state where the unmanned aerial vehicle moves rapidly; the right view of FIG. 18 illustrates that the blur phenomenon is removed in an image 1830 captured in a state where the unmanned aerial vehicle lowers the ISO sensitivity of the camera.

Figure 19:
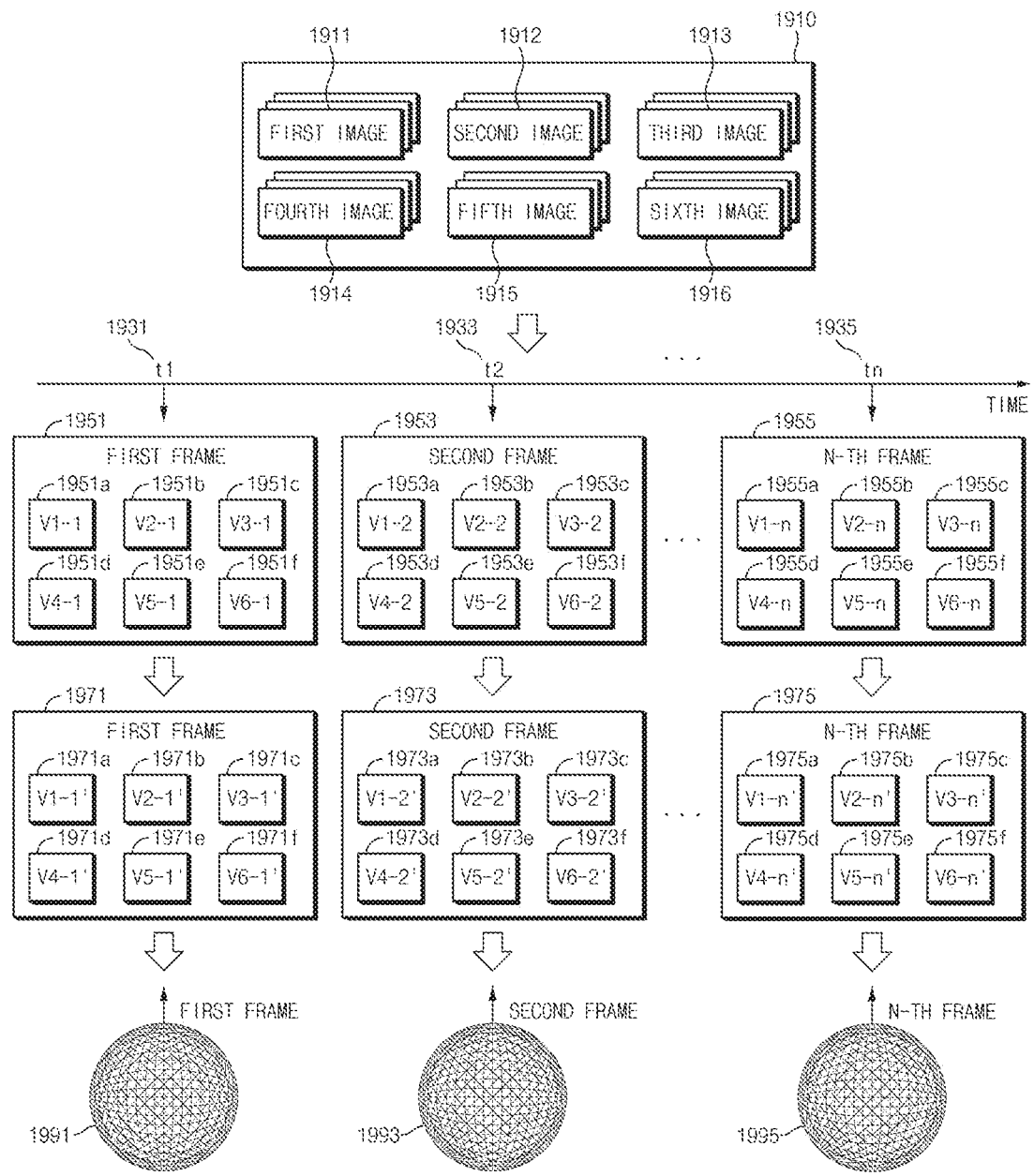
FIG. 19 is a view for describing a method of correcting images captured using a plurality of cameras for each frame and then stitching the corrected image, according to an embodiment.

FIG. 19 is a view for describing a method of correcting images captured using a plurality of cameras for each frame and then stitching the corrected image, according to an embodiment.

Referring to FIG. 19, an unmanned aerial vehicle (e.g., the unmanned aerial vehicle 100) may correct captured images 1910 (e.g., a first image 1911, a second image 1912, a third image 1913, a fourth image 1914, a fifth image 1915, and a sixth image 1916) for each frame and then may stitch the captured images 1910 to obtain an omnidirectional image.

For example, the unmanned aerial vehicle may firstly correct a first frame 1951 of an image obtained at a first time t1 1931, for example, a first frame 1951*a* of the first image 1911, a first frame 1951*b* of the second image 1912, a first frame 1951*c* of the third image 1913, a first frame 1951*d* of the fourth image 1914, a first frame 1951*e* of the fifth image 1915, and a first frame 1951*f* of the sixth image 1916. For example, the unmanned aerial vehicle may firstly correct the first frame 1951 of the image obtained at the first time 1931 and then may obtain a corrected first frame 1971. In other words, the unmanned aerial vehicle may correct each of the first frame 1951*a* of the first image 1911, the first frame 1951*b* of the second image 1912, the first frame 1951*c* of the third image 1913, the first frame 1951*d* of the fourth image 1914, the first frame 1951*e* of the fifth image 1915, and the first frame 1951*f* of the sixth image 1916 and then may obtain a corrected first frame 1971*a* of the first image 1911, a corrected first frame 1971*b* of the second image 1912, a corrected first frame 1971*c* of the third image 1913, a corrected first frame 1971*d* of the fourth image 1914, a corrected first frame 1971*e* of the fifth image 1915, and a corrected first frame 1971*f* of the sixth image 1916.

After correcting each frame, the unmanned aerial vehicle may obtain an omnidirectional image 1991 for the corresponding frame by stitching the corrected frame. For example, the unmanned aerial vehicle may obtain the omnidirectional image 1991 by stitching the corrected first frame 1971*a* of the first image 1911, the corrected first frame 1971*b* of the second image 1912, the corrected first frame 1971*c* of the third image 1913, the corrected first frame 1971*d* of the fourth image 1914, the corrected first frame 1971*e* of the fifth image 1915, and the corrected first frame 1971*f* of the sixth image 1916.

In this way, the unmanned aerial vehicle may also correct images obtained at a second time t2 1933 and then may stitch the corrected images. For example, the unmanned aerial vehicle may firstly correct a second frame 1953 of the image obtained at the second time 1933 and then may obtain a corrected second frame 1973. In other words, the unmanned aerial vehicle may correct each of a second frame 1953*a* of the first image 1911, a second frame 1953*b* of the second image 1912, a second frame 1953*c* of the third image 1913, a second frame 1953*d* of the fourth image 1914, a second frame 1953*e* of the fifth image 1915, and a second frame 1953*f* of the sixth image 1916, which are obtained at the second time 1933, and then may obtain a corrected second frame 1973*a* of the first image 1911, a corrected second frame 1973*b* of the second image 1912, a corrected second frame 1973*c* of the third image 1913, a corrected second frame 1973*d* of the fourth image 1914, a corrected second frame 1973*e* of the fifth image 1915, and a corrected second frame 1973*f* of the sixth image 1916. In addition, the unmanned aerial vehicle may obtain an omnidirectional image 1993 for the second frame by stitching the corrected second frame 1973.

As described above, the unmanned aerial vehicle may correct images obtained at the n-th time 'tn' 1935 and then may stitch the corrected images. For example, the unmanned aerial vehicle may firstly correct an n-th frame 1955 of the image obtained at the n-th time 1935 and then may obtain a corrected n-th frame 1975. In other words, the unmanned aerial vehicle may correct each of a n-th frame 1955*a* of the first image 1911, a n-th frame 1955*b* of the second image 1912, a n-th frame 1955*c* of the third image 1913, a n-th frame 1955*d* of the fourth image 1914, a n-th frame 1955*e* of the fifth image 1915, and a n-th frame 1955*f* of the sixth image 1916, which are obtained at the n-th time 1935, and then may obtain a corrected n-th frame 1975*a* of the first image 1911, a corrected n-th frame 1975*b* of the second image 1912, a corrected n-th frame 1975*c* of the third image 1913, a corrected n-th frame 1975*d* of the fourth image 1914, a corrected n-th frame 1975*e* of the fifth image 1915, and a corrected n-th frame 1975*f* of the sixth image 1916. In addition, the unmanned aerial vehicle may obtain an omnidirectional image 1995 for the n-th frame by stitching the corrected n-th frame 1975.

Figure 20:
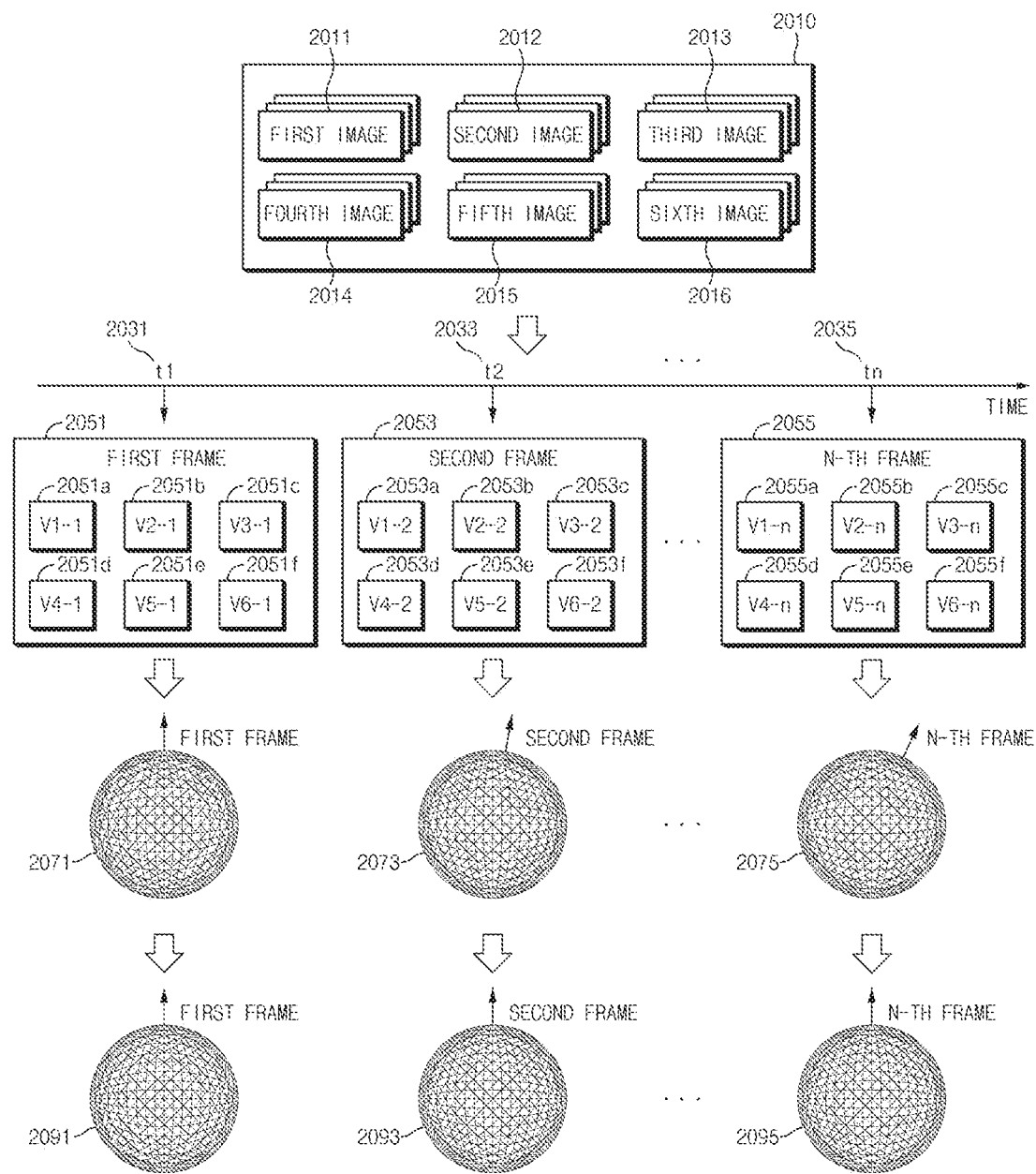
FIG. 20 is a view for describing a method of stitching images captured using a plurality of cameras for each frame and then correcting the stitched image, according to an embodiment.

FIG. 20 is a view for describing a method of stitching images captured using a plurality of cameras for each frame and then correcting the stitched image, according to an embodiment.

Referring to FIG. 20, an unmanned aerial vehicle (e.g., the unmanned aerial vehicle 100) may stitch captured images 2010 (e.g., a first image 2011, a second image 2012, a third image 2013, a fourth image 2014, a fifth image 2015, and a sixth image 2016) for each frame to obtain an omnidirectional image corresponding to each frame and then may correct the obtained omnidirectional image.

For example, the unmanned aerial vehicle may firstly stitch a first frame 2051 of an image obtained at a first time t1 2031, for example, a first frame 2051*a* of the first image 2011, a first frame 2051*b* of the second image 2012, a first frame 2051*c* of the third image 2013, a first frame 2051*d* of the fourth image 2014, a first frame 2051*e* of the fifth image 2015, and a first frame 2051*f* of the sixth image 2016. For example, the unmanned aerial vehicle may firstly obtain an omnidirectional image 2071 for the first frame 2051 of the image obtained at the first time 2031.

After obtaining the omnidirectional image for each frame, the unmanned aerial vehicle may correct the omnidirectional image for each frame. The unmanned aerial vehicle may correct the omnidirectional image 2071 for the first frame 2051 to obtain a corrected omnidirectional image 2091.

In this way, the unmanned aerial vehicle may stitch images obtained at a second time t2 2033 and then may correct the stitched image. For example, the unmanned aerial vehicle may firstly stitch a second frame 2053 of the obtained image at the second time 2033 to obtain an omnidirectional image 2073 for the second frame 2053. In other words, the unmanned aerial vehicle may stitch a second frame 2053a of the first image 2011, a second frame 2053b of the second image 2012, a second frame 2053c of the third image 2013, a second frame 2053d of the fourth image 2014, a second frame 2053e of the fifth image 2015, and a second frame 2053f of the sixth image 2016, which are obtained at the second time 2033, to obtain the omnidirectional image 2073 for the second frame 2053. The unmanned aerial vehicle may correct the omnidirectional image 2073 for the second frame 2053 to obtain a corrected omnidirectional image 2093.

As described above, the unmanned aerial vehicle may stitch images obtained at the n-th time 'tn' 2035 and then may correct the stitched image. For example, the unmanned aerial vehicle may first stitch the n-th frame 2055 of the obtained image at the n-th time 2035 to obtain an omnidirectional image 2075 for the n-th frame 2055. In other words, the unmanned aerial vehicle may stitch the n-th frame 2055a of the first image 2011, the n-th frame 2055b of the second image 2012, the n-th frame 2055c of the third image 2013, the n-th frame 2055d of the fourth image 2014, the n-th frame 2055e of the fifth image 2015, and the n-th frame 2055f of the sixth image 2016, which are obtained at the n-th time 2035 and then may obtain the omnidirectional image 2075 for the n-th frame 2055. Furthermore, the unmanned aerial vehicle may correct the omnidirectional image 2075 for the n-th frame 2055 to obtain a corrected omnidirectional image 2095.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the first processor 911 or the second processor 931), may cause the one or more processors to perform a function corresponding to the instruction. The computer-readable storage media, for example, may be the memory (e.g., the memory 915).

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An unmanned aerial vehicle comprising:
a main body;
a plurality of propeller connection parts extending from at least one side surface of the main body by a specified length;
a plurality of propellers respectively connected to ends of the plurality of propeller connection parts; and
a plurality of cameras mounted on at least one surface of the main body,
wherein a first camera interposed between the plurality of propeller connection parts among the plurality of cameras is disposed spaced from a center point of the main body by a first length,
wherein a first virtual straight line connecting a center point of a first propeller disposed adjacent to the first camera among the plurality of propellers to a center point of the main body corresponds to a second length,
wherein a second virtual straight line drawn vertically from the first camera to the first straight line corresponds to a third length,
wherein the third length is longer than a radius of the first propeller, and
wherein the first length is shorter than the second size length.

2. The unmanned aerial vehicle of claim 1, wherein a second camera, which is interposed between the plurality of propeller connection parts and which is different from the first camera, from among the plurality of cameras is disposed such that a first capture area defined by a capture angle of the first camera partially overlaps with a second capture area defined by a capture angle of the second camera.

3. The unmanned aerial vehicle of claim 2, wherein an overlap angle of an area in which the first capture area overlaps with the second capture area is not less than 10 degrees.

4. The unmanned aerial vehicle of claim 1, wherein a second camera disposed on an upper surface or a lower surface of the main body among the plurality of cameras is disposed such that a first capture area defined by a capture angle of the first camera partially overlaps with a second capture area defined by a capture angle of the second camera.

5. The unmanned aerial vehicle of claim 4, wherein an overlap angle of an area in which the first capture area overlaps with the second capture area is not less than 10 degrees.

6. The unmanned aerial vehicle of claim 1, wherein at least one landing member is disposed on a lower surface of the main body, and
wherein the landing member is positioned within a non-capture area out of capture angles of the plurality of cameras.

7. The unmanned aerial vehicle of claim 1, wherein the main body includes:
a center part; and
a plurality of side parts extending from one part of the center part to the other part of the center part,
wherein each of rims of the side parts is provided in a form of an arc disposed spaced from a center point of the center part by a distance of a specified size, and
wherein each of the plurality of side parts is provided in a form to surround at least one of the plurality of propellers.

8. The unmanned aerial vehicle of claim 7, wherein the side parts includes a first side part and a second side part adjacent to the first side part, and
wherein the first camera is interposed between the first side part and the second side part on at least one side surface of the center part.

9. The unmanned aerial vehicle of claim 7, wherein a second camera disposed on an upper surface or a lower surface of the main body among the plurality of cameras is disposed on an upper surface or a lower surface of the center part.

10. An unmanned aerial vehicle comprising:
a main body including at least one of an upper end frame and a lower end frame;
a circuit mounting part fixed to the at least one of the upper end frame and the lower end frame;
a plurality of propeller connection parts extending from at least one side surface of the main body by a specified length;
a plurality of propellers respectively connected to ends of the plurality of propeller connection parts;
a plurality of camera connection parts extending from at least one surface of the circuit mounting part; and
a plurality of cameras respectively connected to ends of the plurality of camera connection parts,
wherein a first camera interposed between the plurality of propeller connection parts among the plurality of cameras is disposed spaced from a center point of the main body by a first length,
wherein a first virtual straight line connecting a center point of a first propeller disposed adjacent to the first camera among the plurality of propellers to a center point of the main body corresponds to the second length,
wherein a second virtual straight line drawn vertically from the first camera to the first straight line corresponds to a third length,
wherein the third length is longer than a radius of the first propeller, and
wherein the first length is shorter than the second length.

11. The unmanned aerial vehicle of claim 10, wherein at least one of the circuit mounting part and the plurality of camera connection parts is fixed to the upper end frame or the lower end frame through a shock absorbing member.

12. The unmanned aerial vehicle of claim 10, wherein at least one of the plurality of camera connection parts is disposed substantially in parallel with the upper end frame or the lower end frame, and extends to protrude toward an outside of the upper end frame or the lower end frame.

* * * * *